(12) United States Patent
Xu et al.

(10) Patent No.: US 12,125,324 B1
(45) Date of Patent: Oct. 22, 2024

(54) CONFIGURATION EVALUATION METHOD AND PLATFORM FOR ELECTROMECHANICAL COUPLING TRANSMISSION OF HYBRID ELECTRIC VEHICLES

(71) Applicant: BEIHANG UNIVERSITY, Beijing (CN)

(72) Inventors: Xiangyang Xu, Beijing (CN); Junwei Zhao, Beijing (CN); Peng Dong, Beijing (CN); Yanfang Liu, Beijing (CN); Shuhan Wang, Beijing (CN); Wei Guo, Beijing (CN)

(73) Assignee: BEIHANG UNIVERSITY

( * ) Notice: Subject to any disclaimer, the term of this patent is extended or adjusted under 35 U.S.C. 154(b) by 0 days.

(21) Appl. No.: 18/600,731

(22) Filed: Mar. 10, 2024

(30) Foreign Application Priority Data

Mar. 21, 2023 (CN) .................. 202310273078.X

(51) Int. Cl.
*G07C 5/08* (2006.01)
*F16H 61/02* (2006.01)
*F16H 61/00* (2006.01)

(52) U.S. Cl.
CPC ....... *G07C 5/0808* (2013.01); *F16H 61/0202* (2013.01); *F16H 2061/009* (2013.01)

(58) Field of Classification Search
CPC .................................................. G07C 5/0808
See application file for complete search history.

(56) References Cited

U.S. PATENT DOCUMENTS

| 2009/0199560 A1* | 8/2009 | Maier | B60W 10/08 |
| | | | 123/436 |
| 2019/0100094 A1* | 4/2019 | Alonso | B60K 6/485 |
| 2020/0361302 A1* | 11/2020 | Alonso | B60K 6/48 |
| 2021/0213933 A1* | 7/2021 | Borrelli | B60K 6/485 |

(Continued)

FOREIGN PATENT DOCUMENTS

| CA | 2899498 C | * | 5/2021 | ............ B60W 10/02 |
| CN | 100416289 C | * | 9/2008 | ........... G01R 31/006 |
| CN | 201264515 Y | * | 7/2009 | |

(Continued)

*Primary Examiner* — Shelley Chen
(74) *Attorney, Agent, or Firm* — Jose Cherson Weissbrot

(57) ABSTRACT

A configuration evaluation method and a platform for electromechanical coupling transmission of hybrid electric vehicles, includes an energy flow transfer path evaluation module for evaluating the energy flow transfer path, an electromechanical coupling transmission dynamic performance evaluation module for evaluating the dynamic performance of electromechanical coupling transmission, an electromechanical coupling transmission economic efficiency evaluation module for evaluating the economic efficiency of electromechanical coupling transmission, an electromechanical coupling transmission driving cycle adaptability evaluation module for evaluating the driving cycle adaptability of electromechanical coupling transmission, a component feature parameter rationality evaluation module for evaluating the rationality of component feature parameters, a structure and cost evaluation module for evaluating the structure and cost, and a comprehensive evaluation module for performing a comprehensive evaluation.

14 Claims, 2 Drawing Sheets

(56) References Cited

U.S. PATENT DOCUMENTS

2022/0176965 A1* 6/2022 Gesang ................ B60W 10/06

FOREIGN PATENT DOCUMENTS

| | | | | |
|---|---|---|---|---|
| CN | 102009589 A | * | 4/2011 | |
| CN | 102198790 A | * | 9/2011 | |
| CN | 102225684 A | * | 10/2011 | |
| CN | 202053876 U | * | 11/2011 | |
| CN | 108819698 A | * | 11/2018 | ............. B60K 6/365 |
| CN | 108859729 A | * | 11/2018 | ............. B60K 6/365 |
| CN | 215204407 U | * | 12/2021 | |
| FR | 2928792 A1 | * | 9/2009 | ............... B60K 6/36 |

* cited by examiner

CONFIGURATION EVALUATION METHOD AND PLATFORM FOR ELECTROMECHANICAL COUPLING TRANSMISSION OF HYBRID ELECTRIC VEHICLES

TECHNICAL FIELD

This invention generally relates to the technical field of electromechanical coupling transmission of hybrid electric vehicles, and more particularly, to a configuration evaluation method and a platform for electromechanical coupling transmission of hybrid electric vehicles.

BACKGROUND

Hybrid electric vehicles are capable of utilizing a variety of energy sources (e.g., oil, electricity, hydrogen and carbon neutral fuels) in different working modes. An electromechanical coupling transmission is a key assembly for achieving different working modes/gearshifts and energy flow transfer. Like conventional automatic transmissions, the implementation of an electromechanical coupling transmission may adopt various technical solutions, including series, parallel, series-parallel and power split solutions. The selection of technical solutions depends on a general performance of the enterprise technical resources, technical features of electromechanical coupling transmission, product feature demand, economic efficiency, dynamic performance and structural cost. Therefore, performing a comprehensive evaluation on configurations of various hybrid vehicle electromechanical coupling transmissions and an iterative optimization after evaluation are necessary, which guides an enterprise to reasonably select related technical solutions to design and develop electromechanical coupling transmissions.

The configuration evaluation on hybrid electric vehicle electromechanical coupling transmission not only includes the evaluation on product hardware (including structural complexity, weight and cost), but also includes the evaluation on functions that are capable of being implemented by the electromechanical coupling transmission (including energy flow transfer paths, dynamic performance, economic efficiency and driving cycle adaptability). Therefore, it is necessary to construct a configuration evaluation method and a platform that are universal, standardized, efficient and iteratively verifiable for electromechanical coupling transmission of different hybrid electric vehicles.

The electromechanical coupling transmission of hybrid electric vehicles has rich configuration combinations and huge amounts of design parameters, corresponding to different product features, working modes and performances. Presently, conventional configuration evaluation methods do not fully consider the feature parameters of the electromechanical coupling transmission and fail to achieve comprehensive evaluation indicators, rapid and accurate evaluation, and repeated iterative optimization of evaluation results.

SUMMARY

The purpose of the present invention is to provide a configuration evaluation method and a platform for electromechanical coupling transmission of hybrid electric vehicles, thereby guiding the development and design of electromechanical coupling transmission of hybrid electric vehicles.

To achieve the above purpose, the present invention adopts the following technical solution: a configuration evaluation method for electromechanical coupling transmission of hybrid electric vehicles, comprising:

Step 1: evaluating an energy flow transfer path: determining an energy flow transfer path of a configuration to be evaluated, including a pure electric working mode, a series extend range working mode, a parallel charging mode, an engine direct driving mode, a parallel driving mode and a power split working mode; performing kinematic and mechanical analysis on different energy flow transfer paths, determining a rotation speed and torque matching relationship between all components and the engine, driving motor and generator, and performing performance and risk assessments from the perspectives of kinematics and mechanics;

Step 2: evaluating the dynamic performance of electromechanical coupling transmission: evaluating the dynamic performances corresponding to different working modes determined in step 1, comprising calculating the acceleration time under an independent working mode and a joint working mode of the engine and driving motor, as well as the maximum climbing degree and the maximum speed that can be reached;

Step 3: evaluating the economic efficiency of electromechanical coupling transmission: constructing a global optimal energy management strategy to evaluate the energy consumption of the electromechanical coupling transmission, and testing the energy consumption of the electromechanical coupling transmission in a balanced state maintained by the battery SoC, the energy consumption from the SoC maximum limit state to the minimum limit state, and the energy consumption in a power shortage state, thereby calculating the fuel consumption and power consumption per hundred kilometers of the electromechanical coupling transmission, the pure electric endurance mileage, the operating high-efficiency area ratio of the engine, driving motor and generator, as well as the carbon emission data, and predicting an energy consumption cost in each year of travel;

Step 4: evaluating the driving cycle adaptability of electromechanical coupling transmission: further analyzing based on the results calculated by the global optimal energy management strategy in step 3, including the number of switching times of the working modes, the number of engine's startup times, the distribution utilization ratio of operation modes, the brake energy recovery degree, and the number of times of charging and discharging;

Step 5: evaluating the rationality of component feature parameters: introducing different vehicle model parameters, and evaluating whether the electromechanical coupling transmission matches the target vehicle model; introducing all the feature parameters, performing matching checks, proofreading and rationality evaluation on the feature parameters of different components, and performing rationality evaluation on the design scope of different feature parameters;

Step 6: evaluating the structure and cost: evaluating the structure of the electromechanical coupling transmission determined in step 5, including the structural complexity, compactness and enveloping space; evaluating the weight and cost of the electromechanical coupling transmission, including the total weight/cost and item weight/cost;

Step 7: performing a comprehensive evaluation: taking into account the evaluation of energy flow transfer path of the electromechanical coupling transmission, the evaluation of dynamic performance, the evaluation of economic efficiency, the evaluation of driving cycle adaptability, the evaluation of rationality of component feature parameters and the evaluation of structure and cost in steps 1-6, performing a comprehensive evaluation on the effective electromechanical coupling transmission evaluation object determined in step 5, and performing a key optimization on the electromechanical coupling transmission indicators according to the target requirements of product design.

Preferably, step 1 further comprising:

Step 11: evaluating the kinematic and mechanical bearing capacity of individual components: traversing and combining the maximum rotation speed, maximum torque and maximum power of the engine and driving motor/generator, taking them as the inputs, and determining the maximum speed and maximum torque that different components can bear under different working modes based on the speed ratio relationship of energy flow transfer paths, as shown in formula (1-1):

$$\begin{cases} n_{x\_max} = n_{e/M/G\_max} \times i_{x\_e/M/G} \\ T_{x\_max} = T_{e/M/G\_max} / i_{x\_e/M/G} \end{cases} \quad (1\text{-}1)$$

wherein $n_{x\_max}$ represents the maximum rotation speed that can be borne by different components, $T_{x\_max}$ represents the maximum torque that can be borne by different components, $n_{e/M/Gmax}$ represents the maximum rotation speed that the engine, the driving motor and the generator can reach, $T_{e/M/G\_max}$ represents the maximum torque that the engine, the driving motor and the generator can reach, and $i_{x\_e/M/G}$ represents a speed ratio relationship corresponding to different components and the power source;

Step 12: evaluating the kinematic and mechanical bearing capacities of adjacent components: encoding the components in the energy flow transfer paths under different working modes, traversing and combining the given operation limit states (maximum speed/maximum torque/maximum power) of the power source under different working modes, traversing and calculating the rotation speed and torque of adjacent components in the energy flow transfer paths, analyzing the relationships between the relative rotation speed Δn and the relative torque ΔT between adjacent components, and evaluating the relationships between adjacent components in kinematics and mechanics, wherein this process further includes evaluating whether the decoupling and non-decoupling states as well as the kinematic and mechanical relationships of the rotation speed and torque are within a reasonable operation range and whether there is a risk state, as shown in formulas (1-2):

$$\begin{cases} (\Delta n = n_{x\_1} - n_{x\_2}) < n_{1\_2} \\ (\Delta T = T_{x\_1} - T_{x\_2}) < T_{1\_2} \end{cases} \quad (1\text{-}2)$$

wherein $n_{x\_1}$ and $T_{x\_1}$ respectively represent the rotation speed and torque of the first component in the adjacent components in the energy flow transfer paths, $n_{x\_2}$ and $T_{x\_2}$ respectively represent the rotation speed and torque of the second component in the adjacent components, and $n_{1\_2}$/ $T_{1\_2}$ respectively represent the relative rotation speed and torque limits that the components can bear;

Step 13: evaluating the instantaneous bearing capacities of components when switching between different working modes, setting operation states of the power source when switching between different working modes, giving a reasonable switching duration Δt of working modes, and determining the transient bearing capacities of different components during the working mode switching process, determining whether the variation of the relationship between the rotation speed and torque leads to significant impacts on different components, and determining whether there are risk effects on different components, as shown in formulas (1-3):

$$\begin{cases} \Delta n/\Delta t = (n_{x\_1} - n_{x\_2})/\Delta t \\ \Delta T/\Delta t = (T_{x\_1} - T_{x\_2})/\Delta t \end{cases} \quad (1\text{-}3)$$

Step 14: comprehensively evaluating the energy flow transfer paths $E_1$, thereby generating a bearing capacity evaluation table corresponding to different components in energy flow transfer paths under different working modes; meanwhile, evaluating whether the configuration connection mode of electromechanical coupling transmission can be further optimized, thereby ensuring that the energy flow transfer paths reach a reasonable grade; if not, adjusting the reference parameters of the electromechanical coupling transmission;

Preferably, step 2 further comprising:

Step 21: calculating the acceleration time: calculating the acceleration time in an independent working mode: traversing a maximum acceleration state $a_{xmax}$ corresponding to a maximum driving force $F_{xmax}$ output by the electromechanical coupling transmission in different speed states in the independent working mode, and traversing and calculating a minimum acceleration time required under different acceleration states; calculating the acceleration time in a joint working mode: traversing a maximum acceleration state $a_{xmax}$ corresponding to a maximum driving force $F_{xmax}$ jointly provided by the engine and the driving motor and output by the electromechanical coupling transmission in different speed states in the joint independent working mode, and traversing and calculating a minimum acceleration time required under different acceleration states; finally, judging and recording the maximum driving force and the maximum acceleration output by the electromechanical coupling transmission in each speed state in the independent working mode and the joint working mode, and calculating the minimum acceleration time of the electromechanical coupling transmission under different acceleration states, as shown in formulas (2-1), (2-2) and (2-3), $$t_{0-60} = \int_0^{60} \frac{1}{a_{xmax}} du \quad (2\text{-}1)$$

$$t_{0-100} = \int_0^{100} \frac{1}{a_{xmax}} du \quad (2\text{-}2)$$

$$t_{80-120} = \int_{80}^{120} \frac{1}{a_{xmax}} du \quad (2\text{-}3)$$

$$t_{t0-t1} = \int_{t0}^{t1} 1/\text{find}(\max(a_{ICE,t0-t1}), (a_{Mot,t0-t1}), (a_{ICE-Mot,t0-t1})) \quad (2\text{-}4)$$

wherein $t_{0-60}$, $t_{0-100}$ and $t_{80-120}$ respectively represent acceleration times at 0-60 km/h, 0-100 km/h and 80-120 km/h, $t_{t0-t1}$ represents the acceleration time under t0-t1, $a_{ICE,t0-t1}$ represents the maximum acceleration state corresponding to the maximum driving force provided by the engine within time t0-t1, $a_{Mot,t0-t1}$ represents the maximum acceleration state corresponding to the maximum driving force provided by the driving motor within the time t0-t1, $a_{ICE-Mot,t0-t1}$ represents the maximum acceleration state corresponding to the maximum driving force provided by the joint driving of the engine and the driving motor within time t0-t1, and formula (2-4) represents finding the maximum acceleration state corresponding to the maximum driving force that can be provided under different working modes at each moment;

Step 22: calculating the maximum climbing degree $i_{max}$ as shown in formulas (2-5) and (2-6), ensuring that the maximum driving force $F_{max}$ provided by the electromechanical coupling transmission when rolling resistance $F_f$ and wind resistance $F_w$ are overcome under different working modes; traversing the gradient resistance $F_g$ borne by different speed states $V_t$ under different slope gradients until the maximum driving force $F_{xmax}$ provided by the electromechanical coupling transmission in this speed state is equal to the borne resistance, wherein the corresponding slope gradient is the maximum slope gradient that can be reached by the electromechanical coupling transmission, $$\alpha_{max} = \arcsin\left(\frac{F_{xgmax} - (F_f + F_w + F_g)}{G}\right) \quad (2\text{-}5)$$

$$i_{max} = \text{find}(\tan(\alpha_{max})) \quad (2\text{-}6)$$

wherein $\alpha_{max}$ represents a maximum slope angle, and G represents the gravity;

Step 23: calculating the maximum speed: as shown in formula (2-7), traversing and calculating the maximum driving forces $F_{emax}$ and $F_{mmax}$ independently provided by the engine and the driving motor in each speed state, and the maximum driving force $F_{e\text{-}mmax}$ provided by the joint driving of the engine and the driving motor, and comparing, determining and recording the maximum driving force $F_{xmax}$ output by the electromechanical coupling transmission in the three driving states; meanwhile, traversing and calculating the external resistance $F_{dmax}$ borne at each moment in each speed state, including the rolling resistance $F_f$, wind resistance $F_w$, gradient resistance $F_g$ and acceleration resistance $F_a$; further, gradually determining the numerical value relationship of between the driving force and the external resistance in the speed state $V_t$ at each moment until the external resistance $F_{dmax}$ is just greater than the speed state corresponding to the driving force $F_{fmax}$; namely, this speed state being the maximum limit speed state $V_{high}$ that the electromechanical coupling transmission can reach;

$$V_{high} = \text{find}(V_t(F_{fmax} > F_{dmax})) \quad (2\text{-}7);$$

Preferably, step 3 further comprising:

Step 31: constructing a global optimal energy management strategy: first, determining a target driving cycle, and selecting different driving cycles for adaptive combination, wherein each moment corresponds to a state variable $x_t$ and a control variable $u_t$, $f_t(x_t,u_t)$ indicates that there is a unique corresponding relationship between the state variable and the control variable, wherein as shown in formula (3-1), the state variable $x_t$ comprises a battery SoC working mode and an electromechanical coupling transmission working mode, and the control variable $u_t$ comprises the rotation speed and torque of the engine, as well as the rotation speed and the torque of the driving motor; second, determining an optimal control sequence u* of an accumulated objective function J by using a time reversal method, as shown in formula (3-2), calculating and storing a corresponding instantaneous cost function $\Gamma_t$ after combining all state variables and control variables within each time step length, calculating an accumulated cost value, and determining an optimal control sequence by minimizing the accumulated cost, wherein the references of the accumulated objective function in this step are set ideal values of the minimum fuel consumption and the battery SoC target value, and subsequently, a multi-objective optimization may be performed according to the feedback of the evaluation indicators; finally, performing a forward operation under a target driving cycle using the optimal control sequence, thereby obtaining an instantaneous fuel consumption and power consumption of the electromechanical coupling transmission at each moment, and subsequently, obtaining the hundred-kilometer fuel consumption $Q_T$ according to the total fuel consumption $m_T$ and the accumulated driving mileage S corresponding to the operating condition, as shown in formula (3-3), $$x_{t+1} = f_t(x_t, u_t) \quad (3\text{-}1)$$

$$J(x_0) = \min_u J(x_0, u^*) = \Gamma_t(x_t) + \sum_{t=1}^{t-1}\Gamma_t(x_t, u_t) \quad (3\text{-}2)$$

$$Q_T = \frac{m_T}{1000\ \rho S} \times 100 \quad (3\text{-}3)$$

wherein t represents a time step length of the target operating condition, $J(x_0)$ represents an accumulated objective function corresponding to the optimal control sequence u* starting from an initial condition $x_0$, $\Gamma$ represents an instantaneous cost function, wherein the corresponding optimal control sequence is solved when the accumulated objective function is minimized, wherein $\rho$ represents the gasoline density, and S represents the accumulated mileage of travel;

Step 32: performing an energy consumption test by respectively giving an initial state value and a final state value of the SoC, wherein the initial value and the final value of the SoC set in a balanced state maintained by the battery SoC are usually set to be 0.5, wherein for the energy consumption from the SoC maximum limit value state to the minimum limit value state, the initial value and the final value of the SoC are usually set to be 0.7 and 0.3, wherein for the power consumption in a power shortage state, the initial value and the final value of the SoC are both set to be 0.3;

Step 33: after the target driving cycle is given, setting the initial value of the battery SoC to be the maximum limit value state, and making the operating condition cycle using only the pure electric working mode until the final state of the SoC reaches the minimum limit state, and subsequently, respectively recording the pure electric endurance mileages $E_{34\_1}$, $E_{34\_2}$, $E_{34\_3}$ and $E_{34\_4}$ of the electromechanical coupling transmission under different driving cycles including standard, urban, suburban and high-speed driving cycle, wherein the sum of the operating condition weights $\alpha_{34\_1}$, $\alpha_{34\_2}$, $\alpha_{34\_3}$ and $\alpha_{34\_4}$ is 1, and the weights may be adaptively adjusted according to the design requirements, thereby obtaining an accumulated mileage by final weighting, namely, the pure electric endurance mileage $E_{34}$, as shown in formula (3-4):

$$E_{34}=\alpha_{34\_1}E_{34\_1}+\alpha_{34\_2}E_{34\_2}+\alpha_{34\_3}E_{34\_3}+\alpha_{34\_4}E_{34\_4} \quad (3\text{-}4);$$

Step 34: calculating the proportions of high efficiency operation areas of the engine, the driving motor and the generator: as shown in formula (3-5); reading the rotation speeds and torques of the engine, the driving motor and the generator in the optimal control sequence in step 31, drawing operating points on an efficiency map corresponding to the engine, the driving motor and the generator, counting the operating points of the engine in the top 20% percentile of the highest and lowest efficiency areas, and using it as the proportion $E_{35\_1}$ of high efficiency operation area of the engine; similarly, counting the operating points of the driving motor and the generator in the top 20% percentile of the highest and lowest efficiency areas, and using them as the proportions $E_{35\_2}$ and $E_{35\_3}$ of high efficiency operation areas of the driving motor and the generator, $$E_{35\_f}=\text{find}(\text{Map}_f(n_f,T_f)_{(0\text{-}20\%)}) \quad (3\text{-}5)$$

wherein f=1, 2, 3 represents different power sources, including the engine, the driving motor and the generator, $n_f$ represents rotation speeds corresponding to different power sources, and $T_f$ represents torques corresponding to different power sources;

Step 35: calculating the carbon emission data $E_{36}$: according to the hundred-kilometer fuel consumptions $E_{31\_1}$, $E_{32\_1}$, and $E_{33\_1}$ under three different battery SoC state scenarios obtained in step 31, and the sum of the weights $\alpha_{36\_1}$, $\alpha_{36\_2}$, and $\alpha_{36\_3}$ of the three scenarios corresponding to the operating conditions is 1, adaptively adjusting the weights based on the design requirements, and by multiplying with the carbon emission coefficient $K_{co2}$ per liter of gasoline and the estimated annual mileage of travel, thereby obtaining the carbon emission data of the target vehicle model, as shown in formula (3-6):

$$E_{36} = \frac{1}{100} \times (\alpha_{36\_1}E_{31\_1} + \alpha_{36\_2}E_{32\_1} + \alpha_{36\_3}E_{33\_1}) \times K_{co2} \quad (3\text{-}6)$$

Step 36: predicting the energy consumption cost $E_{37}$ in each year of travel, including the fuel consumption cost and power consumption cost: according to the hundred-kilometer fuel consumptions $E_{31\_1}$, $E_{32\_1}$, and $E_{33\_1}$ under three different battery SoC state scenarios obtained in step 31, and the sum of the weights $\alpha_{37\_1}$, $\alpha_{37\_2}$, and $\alpha_{37\_3}$ of the three scenarios corresponding to the operating conditions is 1, adaptively adjusting the weights based on the design requirements, and by multiplying with the cost price per liter of gasoline $P_{fuel}$ and the estimated annual mileage of travel $S_{travel}$, thereby obtaining the fuel consumption cost $E_{37\_1}$, as shown in formula (3-7), wherein similarly, according to the power consumptions corresponding to $E_{31\_2}$, $E_{32\_2}$ and $E_{33\_2}$, and the sum of the weights $\alpha_{37\_1}$, $\alpha_{37\_2}$, and $\alpha_{37\_3}$ of the three scenarios corresponding to the operating conditions is 1, adaptively adjusting the weights based on design requirements, and by multiplying with the cost price per kWh of electricity $P_{Bat}$ with the estimated annual mileage of travel $S_{travel}$, thereby obtaining the power consumption cost $E_{37\_2}$, as shown in formula (3-8), wherein the total energy consumption cost is shown in (3-9):

$$E_{37\_1} = \frac{1}{100} \times (\alpha_{37\_1}E_{31\_1} + \alpha_{37\_2}E_{32\_1} + \alpha_{37\_3}E_{33\_1}) \times P_{fuel} \times S_{travel} \quad (3\text{-}7)$$

$$E_{37\_2} = \frac{1}{100} \times (\alpha_{37\_1}E_{31\_2} + \alpha_{37\_2}E_{32\_2} + \alpha_{37\_3}E_{33\_2}) \times P_{Bat} \times S_{travel} \quad (3\text{-}8)$$

$$E_{37} = E_{37\_1} + E_{37\_2} \quad (3\text{-}9)$$

Preferably, step 4 further comprising:

Step 41: calculating the number of switching times of working modes $E_{41}$: reading the working mode corresponding to each moment calculated by the global optimal energy management strategy in step 31, calculating the working modes of adjacent moments using a difference value method, wherein a zero difference indicates a same working mode, and a non-zero difference indicates different working modes; counting and recording the number of times the non-zero difference appears, which is the number of switching times of working modes of the electromechanical coupling transmission under corresponding operating conditions, as shown in formula (4-1); similarly, recording the number of switching times of working modes $E_{41\_1}$, $E_{41\_2}$, $E_{41\_3}$ and $E_{41\_4}$ under different operating conditions including standard, urban, suburban and high-speed driving cycle, $$E_{41} = \begin{cases} \text{Sum} = \text{Sum} + 0 & \text{if } \text{Mode}(t+1) - \text{Mode}(t) = = 0 \\ \text{Sum} = \text{Sum} + 1 & \text{if } \text{Mode}(t+1) - \text{Mode}(t) \sim = 0 \end{cases} \quad (4\text{-}1)$$

wherein Mode_s(t) represents the working mode at the moment t, and Mode_s(t+1) represents the working mode at the moment t+1;

Step 42: calculating the number of the engine's startup times $E_{42}$: reading the working mode corresponding to each moment calculated by the global optimal energy management strategy in step 31, marking the working mode with the participation of engine as 1 and the working mode without the participation of engine as 0, and calculating the working modes of adjacent moments using a difference value method, wherein when the difference is 0, it indicates a same working mode, and when the difference is 1, it indicates the engine's startup state; subsequently, counting and recording the number of times that the difference is 1 appears, which is the number of engine's startup times of the electromechanical coupling transmission under corresponding operating conditions, as shown in formula (4-2); similarly, recording the number of engine's startup times $E_{42\_1}$, $E_{42\_2}$, $E_{42\_3}$ and $E_{42\_4}$ under different operating conditions (standard, urban, suburban and high-speed driving cycle), $$E_{42} = \begin{cases} \text{Sum} = \text{Sum} + 0 & \text{if } ICE(t+1) - ICE(t) = = 0 \\ \text{Sum} = \text{Sum} + 1 & \text{if } ICE(t+1) - ICE(t) = = 1 \end{cases} \quad (4\text{-}2)$$

wherein ICE(t) represents the engine's startup state at the moment t, and ICE(t+1) represents the engine's startup state at the moment t+1;

Step 43: calculating the proportion of distribution and utilization of working modes $E_{43}$: reading the working mode corresponding to each moment calculated by the global optimal energy management strategy in step 31, wherein different working modes have different marked states; subsequently, counting the number of times that different working modes appear, and recording the proportion of distribution of different working modes by comparing with the total number of times that the working modes appear, as shown in formula (4-3); similarly, recording the proportion of distribution of working modes under different operating conditions including standard, urban, suburban and high-speed driving cycle;

$$E_{43\_y} = \frac{\text{Mode}(y)}{\text{Mode}(\text{Total})} \quad (4\text{-}3)$$

wherein y represents different states of working modes, Mode(y) represents the number of times that different working modes appear, and Mode(Total) represents the total number of times that the working modes appear;

Step 44: evaluating the degree of brake energy recovery and utilization $E_{44}$ in step 4; reading the time segment corresponding to the brake recovery working mode calculated by the global optimal energy management strategy in step 31, and statistically analyzing the energy recovery power $P_r$ in the time segment of brake recovery, as shown in formula (4-4); meanwhile, statistically analyzing and summing up the brake energy recovery power in different time segments under the target operating condition; further, performing a proportion analysis of the total power $P_T$ consumed under the target operating condition, as shown in formula (4-5), thereby determining the degree of energy recovery and utilization in the time segment of the target operating condition, $$P_r = \int_{t10}^{t11} T_{Mot} \times n_{Mot} \times \eta_{Mot}/9550 \quad (4\text{-}4)$$

$$E_{44} = \frac{\sum_{total} P_r}{P_T} \quad (4\text{-}5)$$

wherein $T_{mot}$ represents the torque of the driving motor, $n_{Mot}$ represents the speed of the driving motor, $\eta_{Mot}$ represents the mechanical efficiency of the driving motor at the corresponding speed and torque, t10 represents the starting segment of brake energy recovery, t11 represents the ending segment of brake energy recovery, and $E_{44}$ represents the ratio of brake energy recovery power to total power;

Step 45: calculating the number of charging and discharging times $E_{45\_1}$, distribution range of charging/discharging duration $E_{45\_2}$, and number of switching times of charging and discharging $E_{45\_3}$; reading the working mode corresponding to each moment calculated by the global optimal energy management strategy in step 31, wherein different working modes have different marked states; subsequently, marking the charging state working modes as 10, marking the discharging state working mode as 20, and marking the non-discharging working mode as 0; counting the number of times $E_{45\_1\_charge}/E_{45\_1\_discharge}$ corresponding to the charging/discharging state working modes, and calculating the distribution range of each charging/discharging duration $E_{45\_2\_charge}/E_{45\_2\_discharge}$; in addition, calculating the charging/discharging state of adjacent moments using a difference value method, wherein a zero difference indicates a same state, and a non-zero difference indicates a switching between charging and discharging; counting and recording the number of times that a non-zero difference appears, which is the number of switching times of charging and discharging under the corresponding operating conditions of the electromechanical coupling transmission, as shown in formula (4-6), $$E_{45\_3} = \begin{cases} \text{Sum} = \text{Sum} + 0 \text{ if Bat}(t+1) - \text{Bat}(t) == 0 \\ \text{Sum} = \text{Sum} + 1 \text{ if Bat}(t+1) - \text{Bat}(t) \sim = 0 \end{cases} \quad (4\text{-}6)$$

wherein Bat(t) represents a battery charging/discharging state at the moment t, and Bat(t+1) represents a battery charging/discharging state at the moment t+1;

Preferably, step 5 further comprising:

Step 51: evaluating the matching performance between the electromechanical coupling transmission and the target vehicle model $E_{51}$: using the global optimal energy management strategy in step 31 to traverse the parameters of different target vehicle models, obtaining the performances under different target vehicle model parameters based on the evaluation on dynamic performance, economic efficiency and driving cycle adaptability in steps 2-4, thereby evaluating the matching performance between the electromechanical coupling transmission and the target vehicle model;

Step 52: evaluating the rationality of design scope of different feature parameters of the electromechanical coupling transmission $E_{52}$: traversing the feature parameters of dynamic source components, electrical components and mechanical components of different electromechanical coupling transmissions using the global optimal energy management strategy in step 31, and obtaining the performances under the given target vehicle model parameters according to the evaluation on dynamic performance, economic efficiency and driving cycle adaptability in steps 2-4, thereby evaluating the rationality of the electromechanical coupling transmission under different component feature parameters, wherein the target vehicle model parameters include the vehicle weight, windward area, tire radius, and rolling resistance coefficient, the engine feature parameters include the peak rotation speed, peak torque, and fuel/hydrogen consumption efficiency relationship, the feature parameters of the driving motor and generator include the motor type, peak/rated rotation speed, peak/rated torque and motor mechanical efficiency relationship, and the mechanical component feature parameters include number of different gears, number of gear teeth, definition of speed ratios between different gears, and parameters of clutches/brakes;

Preferably, step 6 further comprising:

Step 61: evaluating the structure $E_6$: evaluating the structural complexity, compactness, enveloping space and weight; performing three-dimensional modeling on the electromechanical coupling transmission to further check whether the structural complexity, compactness and enveloping space of the electromechanical coupling transmission are reasonable;

Step 62: evaluating the weight $E_{62\_1}$ and cost $E_{62\_2}$: evaluating the item weight and item cost of the dynamic source components, the electrical components and the mechanical components of the electromechanical coupling transmission, wherein the dynamic source components include a fuel/hydrogen engine and other components capable of providing power, the electrical components include a driving motor, an generator and electronic control units, and the mechanical components include fixed shaft gears, planetary gears, clutches, brakes and synchronizers; further, performing a statistical analysis on the total weight and total cost of the electromechanical coupling transmission;

Preferably, step 7 further comprising:

Performing dimension reduction on the performance of the effective evaluation object determined in step 5 using a principal component analysis method, thereby determining the number of principal components, wherein the calculation of the principal component indicator weight value $E_{\alpha\_z}$ is shown in formula (7-1); after determining the principal components, analyzing the correlation between each indicator and the corresponding principal component, and decomposing the 20 sub-categories of indicators into different principal components; visually observing the spatial distribution states of different evaluation indicators through a three-dimensional quadrant graph, thereby determining the performances of different effective electromechanical coupling transmission evaluation objects, $$E_{\alpha\_Z} = \frac{\sigma_{\alpha\_z}}{\sum \sigma_{\alpha\_z}} \quad (7\text{-}1)$$

wherein z represents different categories of indicators, $\sigma_{\alpha\_z}$ represents a variance interpretation rate corresponding to different indicators, and $\Sigma\sigma_{\alpha\_z}$ represents an accumulated variance interpretation rate of corresponding indicators; according to the principal component analysis, determining evaluation indicators with poor performance results, newly adding as items into the target functions in the global optimal energy management strategy in step 31 and repeatedly performing iterative optimization; subsequently, repeatedly performing steps 1-6 to perform new rounds of configuration evaluation of electromechanical coupling transmission; finally, generating evaluation result tables of different rounds of evaluation of electromechanical coupling transmission until different evaluation indicators meet the requirements of product design and development, thereby completing the evaluation.

A platform for implementing the configuration evaluation method for electromechanical coupling transmission of hybrid electric vehicles, comprising:

An energy flow transfer path evaluation module for evaluating the energy flow transfer path in step 1: determining an energy flow transfer path of a configuration to be evaluated, including a pure electric working mode, a series extend range working mode, a parallel charging mode, an engine direct driving mode, a parallel driving mode and a power split working mode; performing kinematic and mechanical analysis on different energy flow transfer paths, determining a rotation speed and torque matching relationship between all components and the engine, driving motor and generator, and performing performance and risk assessments from the perspectives of kinematics and mechanics;

An electromechanical coupling transmission dynamic performance evaluation module for evaluating the dynamic performance of electromechanical coupling transmission in step 2: evaluating the dynamic performances corresponding to different working modes determined in step 1, comprising calculating the acceleration time under an independent working mode and a joint working mode of the engine and driving motor, as well as the maximum climbing degree and the maximum speed that can be reached;

An electromechanical coupling transmission economic efficiency evaluation module for evaluating the economic efficiency of electromechanical coupling transmission in step 3: constructing a global optimal energy management strategy to evaluate the energy consumption of the electromechanical coupling transmission, and testing the energy consumption of the electromechanical coupling transmission in a balanced state maintained by the battery SoC, the energy consumption from the SoC maximum limit state to the minimum limit state, and the energy consumption in a power shortage state, thereby calculating the fuel consumption and power consumption per hundred kilometers of the electromechanical coupling transmission, the pure electric endurance mileage, the operating high-efficiency area ratio of the engine, driving motor and generator, and the carbon emission data, and predicting an energy consumption cost in each year of travel;

An electromechanical coupling transmission driving cycle adaptability evaluation module for evaluating the driving cycle adaptability of electromechanical coupling transmission in step 4; further analyzing based on the results calculated by the global optimal energy management strategy in step 3, including the number of switching times of the working modes, the number of engine's startup times, the distribution utilization ratio of operation modes, the brake energy recovery degree, and the number of times of charging and discharging;

A component feature parameter rationality evaluation module for evaluating the rationality of component feature parameters in step 5; introducing different vehicle model parameters, and evaluating whether the electromechanical coupling transmission matches the target vehicle model; introducing all the feature parameters, performing matching checks, proofreading and rationality evaluation on the feature parameters of different components, and performing rationality evaluation on the design scope of different feature parameters;

A structure and cost evaluation module for evaluating the structure and cost in step 6; evaluating the structure of the electromechanical coupling transmission determined in step 5, including the structural complexity, compactness and enveloping space; evaluating the weight and cost of the electromechanical coupling transmission, including the total weight/cost and item weight/cost, and A comprehensive evaluation module for performing a comprehensive evaluation in step 7; taking into account the evaluation of energy flow transfer path of the electromechanical coupling transmission, the evaluation of dynamic performance, the evaluation of economic efficiency, the evaluation of driving cycle adaptability, the evaluation of rationality of component feature parameters and the evaluation of structure and cost in steps 1-6, performing a comprehensive evaluation on the effective electromechanical coupling transmission evaluation object determined in step 5, and performing a key optimization on the electromechanical coupling transmission indicators according to the target requirements of product design.

Compared with the prior art, the present invention has the following advantages:
1) The present invention provides a configuration evaluation method and a platform for electromechanical coupling transmission of hybrid electric vehicles; by means of a dynamic planning method, the search space is reduced; based on this, a global energy management strategy is used to perform configuration evaluation; the method achieves high calculation speed and accurate calculation results while effectively improving the evaluation efficiency;
2) According to the present invention, 20 sub-categories of indicators are visually evaluated and analyzed by adopting a principal component analysis method, which clearly indicates a target direction of iterative optimization and overcomes the defect that a plurality of indicators of the electromechanical coupling transmission cannot be visually analyzed; because the evaluation indicators are comprehensive, the evaluation method and the platform are capable of indicating the optimization direction of the electromechanical coupling transmission;
3) According to the present invention, six categories including 20 sub-categories of indicators are considered, allowing different evaluation indicators to be reversely fed back to the target function of the global energy management strategy for iterative optimization; therefore, the problems relating to a one-way evaluation, single target function and failure of enabling the evaluation results to be effectively fed back to the electromechanical coupling transmission for iterative optimization are solved;
4) Before the trial-manufacturing and development of the electromechanical coupling transmission of hybrid electric vehicles, a large amount of performance evaluation may be performed on the mechanical configuration, working mode, function and product features of hybrid electric vehicles based on actual product target requirements, thereby significantly improving the development efficiency of the electromechanical coupling transmission of hybrid electric vehicles;
5) The comprehensive evaluation method and platform of the present invention allow the feature parameters of the electromechanical coupling transmission to be fully considered, achieve comprehensive evaluation indicators, rapid and accurate evaluation method, and iterative optimization of evaluation results according to the evaluation indicators until the electromechanical coupling transmission meets the design requirements.

BRIEF DESCRIPTION OF THE DRAWINGS

To more clearly illustrate the embodiments of the present invention or the technical solutions in the prior art, the drawings that need to be used in the embodiments are briefly described below. The drawings allow the features and benefits of the present invention to be clearly understood. The drawings are illustrative and should not be construed as any limitation to the present invention. For those skilled in the art, other drawings may be obtained based on the drawings of the present invention without paying creative labor.

DETAILED DESCRIPTION

To allow the purposes, features and benefits of the present invention to be better understood, a detailed description of the present invention is provided below in combination with the drawings and specific embodiments. It should be noted that the embodiments of the present invention and the features in the embodiments may be combined with each other without conflict.

In addition, to allow the details of the present invention to be better understood, the present invention may also be implemented in other ways different from those described herein. Therefore, the scope of the present invention is not limited by the specific embodiments described below.

Figure 1:
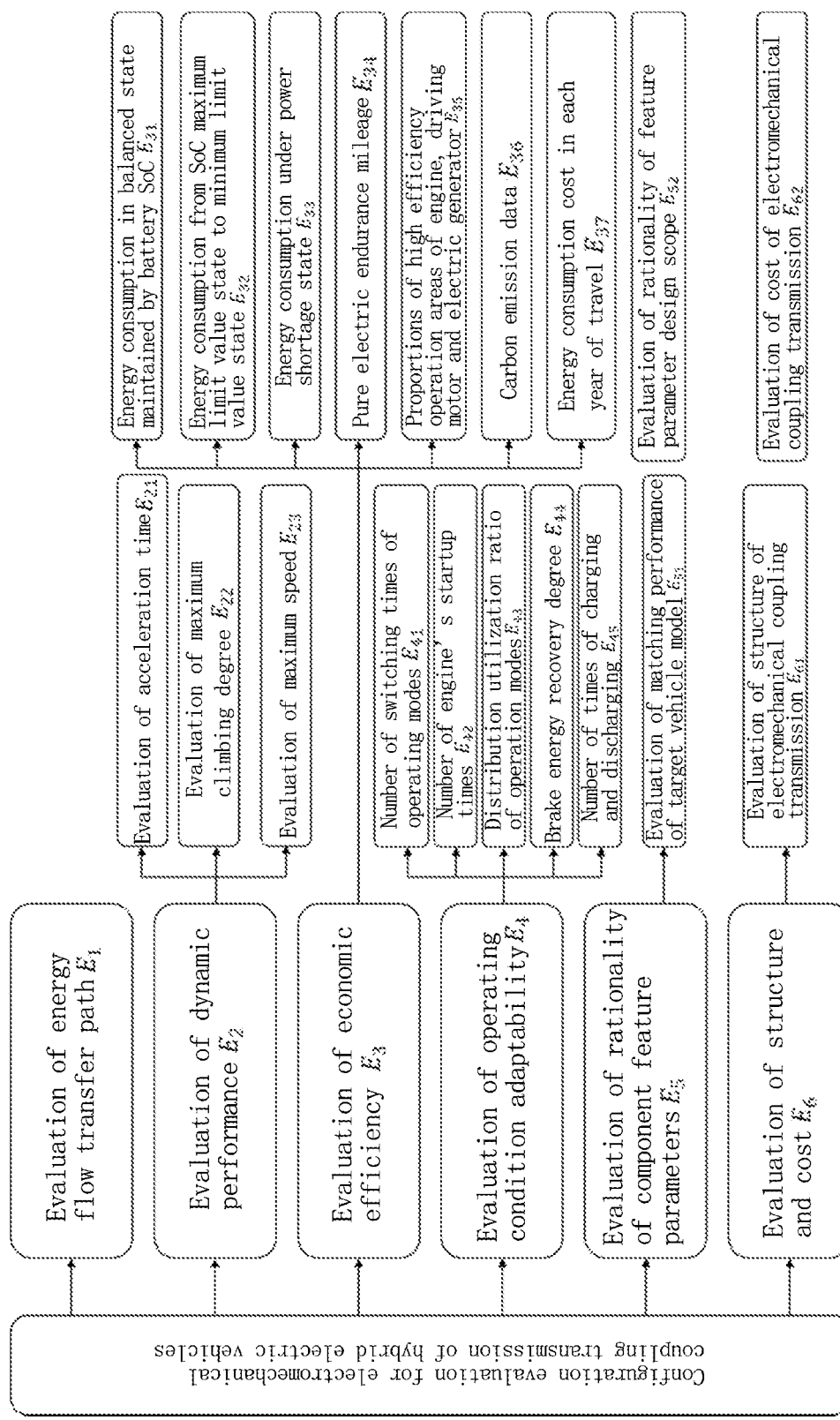
FIG. 1 is a schematic diagram illustrating the configuration evaluation indicators for electromechanical coupling transmission of hybrid electric vehicles.
Figure 2:
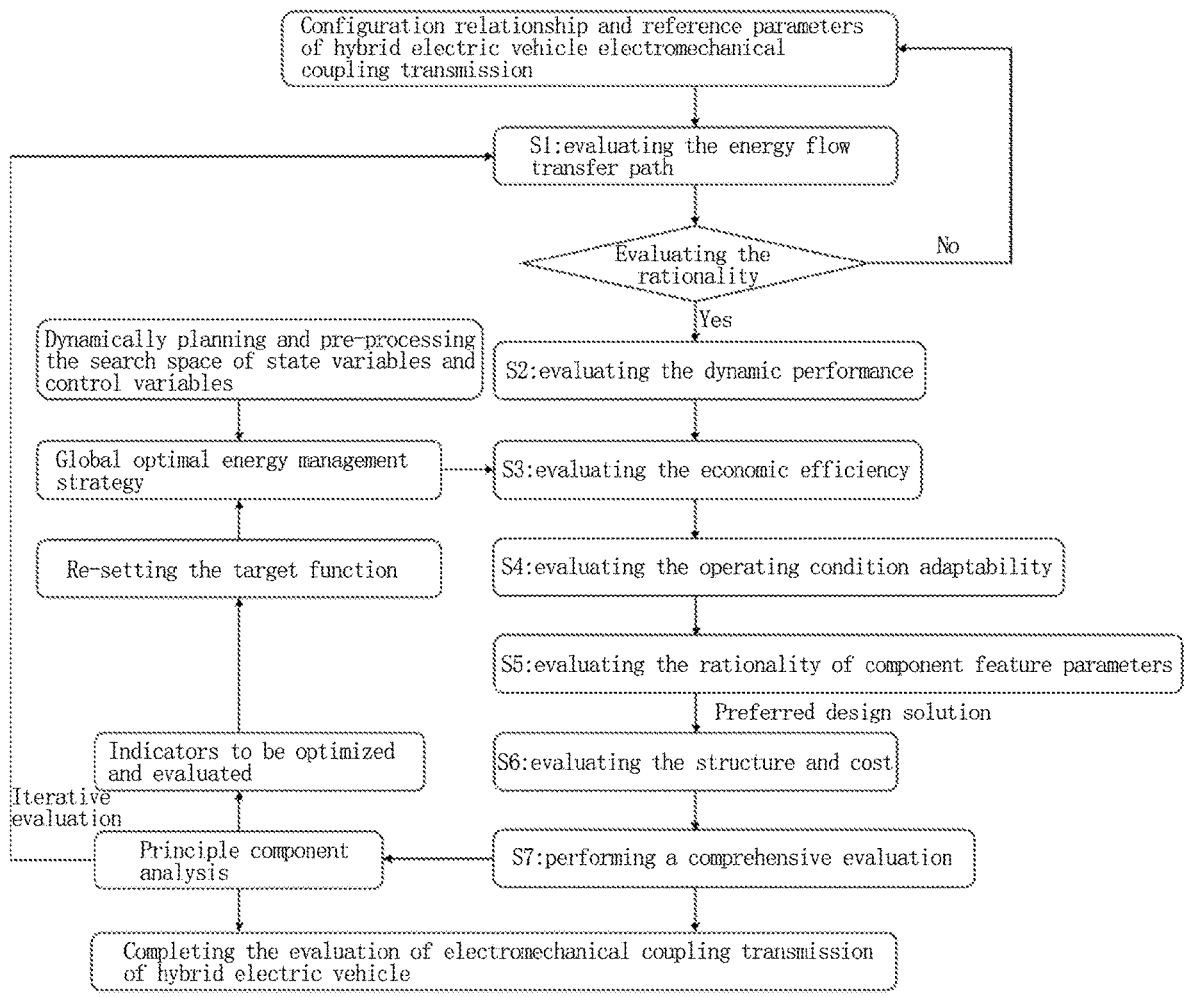
FIG. 2 is a schematic diagram illustrating the configuration evaluation process for electromechanical coupling transmission of hybrid electric vehicles.

FIG. 1 shows the evaluation indicators for electromechanical coupling transmission of hybrid electric vehicles, and FIG. 2 shows a configuration evaluation process for electromechanical coupling transmission of hybrid electric vehicles. The specific implementation of the present invention, comprising: obtaining configuration relationships and reference parameters for the electromechanical coupling transmission of hybrid electric vehicles to be evaluated: step 1: evaluating energy flow transfer paths, wherein in this step, the working mode of the electromechanical coupling transmission needs to be determined, the components in different working modes are encoded, matching relationships of the rotation speed and torque among all components, an engine and a driving motor/generator are determined, and performance and risk assessments from the perspectives of kinematics and mechanics are performed; on the premise of ensuring that the assessment results of the energy flow transfer path is reasonable, the evaluation in step 2 is performed, and if not, the reference parameters of the electromechanical coupling transmission are adjusted; step 2: evaluating the dynamic performance, including evaluating the acceleration duration (0-60 km/h, 0-100 km/h and 80-120 km/h) in an independent working mode ((an independent driving of the engine (including different gears), and an independent driving of the driving motor (including different gears)), the acceleration duration in a joint (engine and driving motor) working mode, as well as the maximum climbing degree and maximum speed that can be achieved in different working modes; step 3: evaluating the economic efficiency, wherein a dynamic planning method is adopted to pre-process the search space of the state variables and control variables and is applied to a global optimal energy management strategy; moreover, an objective function may be reset according to the obtained evaluation indicators for performing an iterative optimization; this strategy is used to obtain the fuel consumption and electricity consumption per hundred kilometers, pure electric endurance mileage, the proportions of high efficiency operation areas of the engine, driving motor and generator, carbon emission data, and to predict the annual energy consumption cost of the electromechanical coupling transmission under different operating conditions and battery SoC scenarios (battery SoC balance-maintaining state, SoC maximum to minimum limiting value state and power shortage state); step 4: evaluating the driving cycle adaptability, wherein in this step, the driving cycle adaptability is further analyzed based on the results calculated by using the global optimal energy management strategy, including the number of switching times of working modes, the number of the engine's startup times, the proportion of distribution and utilization of working modes, the evaluation of the degree of brake energy recovery and utilization, and the number of charging and discharging times; step 5: evaluating the rationality of the component feature parameters, including introducing different vehicle model parameters, and evaluating whether the electromechanical coupling transmission matches the target vehicle model; specifically, introducing all feature parameters such as power source components, electrical components and mechanical components, performing matching checks, proofreading and rationality evaluation on the feature parameters of different components, and evaluating the rationality of the design scope of different feature parameters; more specifically, preferably evaluating the traversed target vehicle model parameters and the electromechanical coupling transmission feature parameters, thereby determining an effective electromechanical coupling transmission evaluation object; step 6: performing an evaluation on the structure and cost of the corresponding optimal design solution, wherein the structure evaluation includes the evaluation of structural complexity, compactness and enveloping space; in addition, performing an evaluation on the weight and cost of the electromechanical coupling transmission; step 7: performing a comprehensive evaluation, including evaluating the energy flow transfer path of the electromechanical coupling transmission in steps 1-6, evaluating the dynamic performance, evaluating the economic efficiency, evaluating the driving cycle adaptability, evaluating the rationality of the component feature parameters, and evaluating the structure and cost; specifically, performing a comprehensive evaluation on the effective evaluation object of the electromechanical coupling transmission determined in step 5, visually observing the spatial distribution states of different evaluation indicators through a three-dimensional quadrant graph using a principal component analysis method, and determining evaluation indicators with poor performance results; further, newly adding it as one of the objective functions of the global optimal energy management strategy proposed in step 31, repeatedly performing the iterative optimization, and repeatedly performing steps 1-6, thereby performing a new round of hybrid transmission configuration evaluation; generating an evaluation result table for electromechanical coupling transmission of different rounds of evaluation, and completing the evaluation of electromechanical coupling transmission until different evaluation indicators meet the requirements of the product design and development.

The specific implementation of the configuration evaluation method and the platform for electromechanical coupling transmission of hybrid electric vehicles are described in the following embodiment:

Step 1: evaluating energy flow transfer paths $E_1$: generating corresponding configurations of solid structure components including the power source components, electrical components and mechanical components of the electromechanical coupling transmission of the hybrid electric vehicle according to an actual layout structure and mechanical/electrical connection relationship; determining the energy flow transfer paths of the configurations to be evaluated, including pure electric working mode (including different gears), series extend range working mode (including different gears), parallel charging working mode (including different gears), engine direct driving working mode (including different gears), parallel driving working mode (including different gears) and power split working mode; performing kinematic and mechanical analysis on different energy flow transfer paths, determining the rotation speed and torque matching relationships between all components and the engine, driving motor as well as generator, and performing performance and risk assessments from the perspectives of kinematics and mechanics;

Specifically, for example, evaluating a series-parallel connected electromechanical coupling transmission (engine direct driving $2^{nd}$ gear and driving motor direct driving $2^{nd}$ gear), there are a total of 14 working modes, including pure electric $1^{st}$ gear, pure electric $2^{nd}$ gear, brake energy recovery $1^{st}$ gear, brake energy recovery $2^{nd}$ gear, series extend range $1^{st}$ gear, series extend range $2^{nd}$ gear, parallel charging $1^{st}$ gear, parallel charging $2^{nd}$ gear, engine direct driving $1^{st}$ gear, engine direct driving $2^{nd}$ gear, parallel driving (engine direct driving $1^{st}$ gear and driving motor direct driving $1^{st}$ gear), parallel driving (engine direct driving $1^{st}$ gear and driving motor direct driving $2^{nd}$ gear), parallel driving (engine direct driving $2^{nd}$ gear and driving motor direct driving $1^{st}$ gear), and parallel driving (engine direct driving $2^{nd}$ gear and driving motor direct driving $2^{nd}$ gear);

Further, taking the parameters of the power source required for kinematic and mechanical analysis (including the rotation speed, torque, and power of the engine and driving motor/generator) as basic parameters, and calculating the speed ratio relationship from the power source to the wheel ends based on the gear parameters in the energy flow transfer paths, thereby constraining the operation boundary conditions of kinematics and mechanics corresponding to different working modes;

First, evaluating the kinematic and mechanical bearing capacities of individual components: evaluating the bearing capacities of an individual component (x refers to the bearing capacities of all components (including gears, planetary gear sets, clutches, brakes and synchronizers, etc.) in the electromechanical coupling transmission configuration under different kinematic and mechanical states;

Traversing and combining the maximum rotation speed, maximum torque and maximum power of the engine and driving motor/generator, taking them as the inputs, and determining the maximum speed and maximum torque that different components can bear under different working modes based on the speed ratio relationship of energy flow transfer paths, as shown in formula (1-1):

$$\begin{cases} n_{x\_max} = n_{e/M/G\_max} \times i_{x\_e/M/G} \\ T_{x\_max} = T_{e/M/G} / i_{x\_e/M/G} \end{cases} \quad (1\text{-}1)$$

wherein $n_{x\_max}$ represents the maximum rotation speed that can be borne by different components, $T_{x\_max}$ represents the maximum torque that can be borne by different components, $n_{e/M/G\_max}$ represents the maximum rotation speed that the engine, the driving motor and the generator can reach, $T_{e/M/G\_max}$ represents the maximum torque that the engine, the driving motor and the generator can reach, and $i_{x\_e/M/G}$ represents a speed ratio relationship corresponding to different components and the power source;

Specifically, second, evaluating the kinematic and mechanical bearing capacities of adjacent components: encoding the components in the energy flow transfer paths under different working modes, traversing and combining the given operation limit states (maximum speed/maximum torque/maximum power) of the power source under different working modes, traversing and calculating the rotation speed and torque of adjacent components in the energy flow transfer paths, analyzing the relationships between the relative rotation speed Δn and the relative torque ΔT between adjacent components, and evaluating the relationships between adjacent components in kinematics and mechanics, wherein this process further includes evaluating whether the decoupling and non-decoupling states as well as the kinematic and mechanical relationships of the rotation speed and torque are within a reasonable operation range and whether there is a risk state, as shown in formulas (1-2):

$$\begin{cases} (\Delta n = n_{x\_1} - n_{x\_2}) < n_{1\_2} \\ (\Delta T = T_{x\_1} - T_{x\_2}) < T_{1\_2} \end{cases} \quad (1-2)$$

wherein $n_{x\_1}$ and $T_{x\_1}$ respectively represent the rotation speed and torque of the first component in the adjacent components in the energy flow transfer paths, $n_{x\_2}$ and $T_{x\_2}$ respectively represent the rotation speed and torque of the second component in the adjacent components, and $n_{1\_2}$/$T_{1\_2}$ respectively represent the relative rotation speed and torque limits that the components can bear;

Specifically, finally, evaluating the transient bearing capacities of components when switching between different working modes, setting operation states of the power source when switching between different working modes, giving a reasonable switching duration Δt of working modes, and determining the transient bearing capacities of different components during the working mode switching process, determining whether the variation of the relationship between the rotation speed and torque leads to significant impacts on different components, and determining whether there are risk effects on different components, as shown in formulas (1-3):

$$\begin{cases} \Delta n/\Delta t = (n_{x\_1} - n_{x\_2})/\Delta t \\ \Delta T/\Delta t = (T_{x\_1} - T_{x\_2})/\Delta t \end{cases} \quad (1-3)$$

Step 2: evaluating the dynamic performance of electromechanical coupling transmission $E_2$;

Evaluating the dynamic performances corresponding to different working modes of the electromechanical coupling transmission determined in step 1, including evaluating the acceleration time (0-60 km/h, 0-100 km/h and 80-120 km/h) under an independent working mode (engine direct driving $1^{st}$ gear, engine direct driving $2^{nd}$ gear, driving motor direct driving $1^{st}$ gear, and driving motor direct driving $2^{nd}$ gear), and engine and driving motor joint working mode ((engine direct driving $1^{st}$ gear and driving motor direct driving $1^{st}$ gear), (engine direct driving $1^{st}$ gear and driving motor direct driving $2^{nd}$ gear), (engine direct driving $2^{nd}$ gear and driving motor direct driving $1^{st}$ gear) and (engine direct driving $2^{nd}$ gear and driving motor direct driving $2^{nd}$ gear)), as well as the maximum climbing degree and maximum speed achievable under different working modes, wherein step 21 relates to the acceleration time of step 2, calculating the acceleration time in an independent working mode should first traverse a maximum acceleration state $a_{xmax}$ corresponding to a maximum driving force $F_{xmax}$ output by the electromechanical coupling transmission in different speed states in the independent working mode, and traverse and calculate a minimum acceleration time required under different acceleration states (0-60 km/h, 0-100 km/h and 80-120 km/h); finally, judge and record the maximum driving force and the maximum acceleration state output by the electromechanical coupling transmission in each speed state in the independent working mode and the joint working mode, and calculate the minimum acceleration time of the electromechanical coupling transmission under different acceleration states (0-60 km/h, 0-100 km/h and 80-120 km/h), as shown in formulas (2-1), (2-2) and (2-3), $$t_{0-60} = \int_0^{60} \frac{1}{a_{xmax}} du \quad (2-1)$$

$$t_{0-100} = \int_0^{100} \frac{1}{a_{xmax}} du \quad (2-2)$$

$$t_{80-120} = \int_{80}^{120} \frac{1}{a_{xmax}} du \quad (2-3)$$

$$t_{t0-t1} = \int_{t0}^{t1} 1/\text{find}(\max(a_{ICE,t0-t1}), (a_{Mot,t0-t1}), (a_{ICE-Mot,t0-t1})) \quad (2-4)$$

wherein $t_{0-60}$, $t_{0-100}$ and $t_{80-120}$ respectively represent acceleration times at 0-60 km/h, 0-100 km/h and 80-120 km/h, $t_{t0-t1}$ represents the acceleration time under t0-t1, $a_{ICE,t0-t1}$ represents the maximum acceleration state corresponding to the maximum driving force provided by the engine within time t0-t1, $a_{Mot,t0-t1}$ represents the maximum acceleration state corresponding to the maximum driving force provided by the driving motor within the time t0-t1, $a_{ICE-Mot,t0-t1}$ represents the maximum acceleration state corresponding to the maximum driving force provided by the joint driving of the engine and the driving motor within time t0-t1, and formula (2-4) represents finding the maximum acceleration state corresponding to the maximum driving force that can be provided under different working modes at each moment, wherein step 22 relates to the maximum climbing degree $i_{max}$ in step 2, wherein as shown in formulas (2-5) and (2-6), the calculations should ensure the maximum driving force $F_{max}$ provided by the electromechanical coupling transmission when rolling resistance $F_f$ and wind resistance $F_w$ are overcome under different working modes (including an independent working mode and a joint working mode), wherein based on this, the gradient resistance $F_g$ borne by different speed states $V_t$ under different slope gradients is traversed until the maximum driving force $F_{xmax}$ provided by the electromechanical coupling transmission in this speed state is equal to the borne resistance, and the corresponding slope gradient is the maximum slope gradient that can be reached by the electromechanical coupling transmission, $$\alpha_{max} = \arcsin\left(\frac{F_{xgmax} - (F_f + F_w + F_g)}{G}\right) \quad (2-5)$$

$$i_{max} = \text{find}(\tan(\alpha_{max})) \quad (2-6)$$

wherein $\alpha_{max}$ represents a maximum slope angle, and G represents the gravity, wherein step 23 relates to the calculation of the maximum speed in step 2, as shown in formula (2-7), traversing and calculating the maximum driving forces $F_{emax}$ and $F_{mmax}$ independently provided by the engine and the driving motor in each speed state, and the maximum driving force $F_{emax}$ provided by the joint driving of the engine and the driving motor, and comparing, determining and recording the maximum driving force $F_{xmax}$ output by the electromechanical coupling transmission in the three driving states; meanwhile, traversing and calculating the external resistance $F_{dmax}$ borne at each moment in each speed state, including the rolling resistance $F_f$, wind resistance $F_w$, gradient resistance $F_g$ and acceleration resistance $F_a$; further, gradually determining the numerical value relationship of between the driving force and the external resistance in the speed state $V_t$ at each moment until the external resistance $F_{dmax}$ is just greater than the speed state corresponding to the driving force $F_{fmax}$, namely, this speed state being the maximum limit speed state v that the electromechanical coupling transmission can reach;

$$V_{high} = \text{find}(V_t(F_{fmax} > F_{dmax})) \tag{2-7}$$

Step 3: evaluating the economic efficiency $E_3$ of the electromechanical coupling transmission:

Constructing a global optimal energy management strategy to evaluate the energy consumption (oil consumption, power consumption or hydrogen consumption) of the electromechanical coupling transmission given in step 1, and testing the energy consumption $E_{31}$ of the electromechanical coupling transmission in a balanced state maintained by the battery SoC, the energy consumption $E_{32}$ from the SoC maximum limit state to the minimum limit state, and the energy consumption $E_{33}$ in a power shortage state, thereby analyzing and calculating the fuel consumption and power consumption per hundred kilometers of the electromechanical coupling transmission of the hybrid electric vehicle, wherein in addition, the evaluation of economic efficiency also includes evaluating the pure electric endurance mileage $E_{34}$, the proportions $E_{35}$ of high efficiency operation areas of the engine, driving motor and generator and carbon emission data $E_{36}$, and predicting the energy consumption cost $E_{37}$ in each year of travel, wherein step 31 relates to the global optimal energy management strategy proposed in step 3, and before adopting this strategy, a preprocessing is performed by using a dynamic planning algorithm, so that the search space of the state variables and the control variables is reduced and the calculation speed is accelerated;

The global optimal energy management strategy mainly comprises the following three steps: first, determining a target driving cycle (giving a speed curve under a time sequence, and discretizing at a certain time step length), wherein different operating conditions, such as standard, urban, suburban, and high-speed driving cycle may be combined according to actual needs, wherein each moment corresponds to a state variable $x_t$ and a control variable $u_t$, $f_t(x_t,u_t)$ indicates that there is a unique corresponding relationship between the state variable and the control variable, wherein as shown in formula (3-1), the state variable x, comprises a battery SoC working mode and an electromechanical coupling transmission working mode, and the control variable u, comprises the rotation speed and torque of the engine, as well as the rotation speed and the torque of the driving motor, wherein this step corresponds to the preprocessed state variable and control variable, so that the search space becomes more targeted than using an exhaustive traversal; second, determining an optimal control sequence u* of an accumulated objective function J by using a time reversal method, as shown in formula (3-2), calculating and storing a corresponding instantaneous cost function $\Gamma_t$ after combining all state variables and control variables within each time step length, calculating an accumulated cost value, and determining an optimal control sequence by minimizing the accumulated cost, wherein the references of the accumulated objective function in this step are set ideal values of the minimum fuel consumption and the battery SoC target value, and subsequently, a multi-objective optimization may be performed according to the feedback of the evaluation indicators, wherein for example, when frequent charging and discharging occur, it may be set as one of the objective functions and solved by using the iterative optimization; finally, performing a forward operation under a target driving cycle using the optimal control sequence, thereby obtaining an instantaneous fuel consumption and power consumption of the electromechanical coupling transmission at each moment, and subsequently, obtaining the hundred-kilometer fuel consumption $Q_T$ according to the total fuel consumption $m_T$ and the accumulated driving mileage S corresponding to the operating condition, as shown in formula (3-3); the above method achieves high calculation speed and accurate calculation results and is capable of quickly iterating and optimizing different design parameters and objective functions, $$x_{t+1} = f_t(x_t, u_t) \tag{3-1}$$

$$J(x_0) = \min_u J(x_0, u^*) = \Gamma_t(x_t) + \sum_{t=1}^{t-1} \Gamma_t(x_t, u_t) \tag{3-2}$$

$$Q_T = \frac{m_T}{1000\rho S} \times 100 \tag{3-3}$$

wherein t represents a time step length of the target operating condition, $J(x_0)$ represents an accumulated objective function corresponding to the optimal control sequence u* starting from an initial condition $x_0$, $\Gamma$ represents an instantaneous cost function, wherein the corresponding optimal control sequence is solved when the accumulated objective function is minimized, wherein $\rho$ represents the gasoline density, and S represents the accumulated driving mileage;

According to step 31, an energy consumption test may be performed by respectively giving an initial state value and a final state value of the SoC, wherein the initial value and the final value of the SoC set in a balanced state maintained by the battery SoC are usually set to be 0.5, wherein for the energy consumption from the SoC maximum limit value state to the minimum limit value state, the initial value and the final value of the SoC are usually set to be 0.7 and 0.3, wherein for the power consumption in a power shortage state, the initial value and the final value of the SoC are both set to be 0.3; according to the set SoC initial value and final value, the hundred-kilometer fuel consumption $E_{31\_1}$, $E_{32\_1}$ and $E_{33\_1}$ as well as the corresponding hundred-kilometer power consumption $E_{31\_2}$, $E_{32\_2}$ and $E_{33\_2}$ of the electromechanical coupling transmission of the hybrid electric vehicle are analyzed and calculated by step 31;

Step 32 relates to the pure electric endurance mileage in step 3, wherein after different operating conditions such as standard, urban, suburban, and high-speed driving cycle are given, the initial value of the battery SoC is set to be the maximum limit value state, and the operating condition is cycled using only the pure electric working mode, wherein in this process, the engine is not initiated until the final value state of the SoC reaches the minimum limit value state, and subsequently, the pure electric endurance mileages $E_{34\_1}$, $E_{34\_2}$, $E_{34\_3}$ and $E_{34\_4}$ of the electromechanical coupling transmission under different driving conditions are respectively recorded, wherein an operating condition may be newly added according to actual needs, wherein the sum of the operating condition weights $\alpha_{34\_1}$, $\alpha_{34\_2}$, $\alpha_{34\_3}$ and $\alpha_{34\_4}$ is 1, and the weights may be adaptively adjusted according to the design requirements, thereby obtaining an accumulated mileage by final weighting, namely, the pure electric endurance mileage $E_{34}$, as shown in formula (3-4):

$$E_{34}=\alpha_{34\_1}E_{34\_1}+\alpha_{34\_2}E_{34\_2}+\alpha_{34\_3}E_{34\_3}+\alpha_{34\_4}E_{34\_4} \quad (3\text{-}4)$$

Step 33 relates to the proportions $E_{35}$ of high efficiency operation areas of the engine, the driving motor and the generator in step 3, as shown in formula (3-5); reading the rotation speeds and torques of the engine, the driving motor and the generator in the optimal control sequence in step 31, drawing operating points on an efficiency map corresponding to the engine, the driving motor and the generator, counting the operating points of the engine in the top 20% percentile of the highest and lowest efficiency areas, and using it as the proportion $E_{35\_1}$ of high efficiency operation area of the engine; similarly, counting the operating points of the driving motor and the generator in the top 20% percentile of the highest and lowest efficiency areas, and using them as the proportions $E_{35\_2}$ and $E_{35\_3}$ of high efficiency operation areas of the driving motor and the generator, $$E_{35\_f}=\text{find}(\text{Map}_f(n_f,T_f)_{(0\text{-}20\%)}) \quad (35)$$

wherein f=1, 2, 3 represents different power sources, including the engine, the driving motor and the generator, $n_f$ represents rotation speeds corresponding to different power sources, and $T_f$ represents torques corresponding to different power sources;

Step 34 relates to the carbon emission data $E_{36}$ in step 3, wherein according to the hundred-kilometer fuel consumptions $E_{31\_1}$, $E_{32\_1}$, and $E_{33\_1}$ under three different battery SoC state scenarios obtained in step 31, the sum of the weights $\alpha_{36\_1}$, $\alpha_{36\_2}$, and $\alpha_{36\_3}$ of the three scenarios corresponding to the operating conditions is 1, wherein according to the design requirements, the weight may be adaptively adjusted, and by multiplying it with the carbon emission coefficient $K_{co2}$ per liter of gasoline (which is usually 2.9251 kg-co2/kg) and the estimated annual mileage of travel, the carbon emission data of the target vehicle model is obtained, as shown in formula (3-6):

$$E_{36} = \frac{1}{100} \times (\alpha_{36\_1}E_{31\_1} + \alpha_{36\_2}E_{32\_1} + \alpha_{36\_3}E_{33\_1}) \times K_{co2} \quad (3\text{-}6)$$

Step 35 relates to the predicted energy consumption cost $E_{37}$ (including the fuel consumption cost and power consumption cost) in each year of travel in step 3, wherein according to the hundred-kilometer fuel consumptions $E_{31\_1}$, $E_{32\_1}$, and $E_{33\_1}$ under three different battery SoC state scenarios obtained in step 31, the sum of the weights $\alpha_{37\_1}$, $\alpha_{37\_2}$, and $\alpha_{37\_3}$ of the three scenarios corresponding to the operating conditions is 1, wherein according to the design requirements, the weight may be adaptively adjusted, and by multiplying it with the cost price per liter of gasoline $P_{fuel}$ and the estimated annual mileage of travel $S_{travel}$, the fuel consumption cost $E_{37\_1}$ is obtained, as shown in formula (3-7), wherein similarly, according to the power consumptions corresponding to $E_{31\_2}$, $E_{32\_2}$ and $E_{33\_2}$, the sum of the weights $\alpha_{37\_1}$, $\alpha_{37\_2}$, and $\alpha_{37\_3}$ of the three scenarios corresponding to the operating conditions is 1, wherein according to the design requirements, the weight may be adaptively adjusted, and by multiplying it with the cost price per kWh of electricity $P_{Bat}$ with the estimated annual mileage of travel $S_{travel}$, the power consumption cost $E_{37\_2}$ is obtained, as shown in formula (3-8), wherein the total energy consumption cost is shown in (3-9):

$$E_{37\_1} = \frac{1}{100} \times (\alpha_{37\_1}E_{31\_1} + \alpha_{37\_2}E_{32\_1} + \alpha_{37\_3}E_{33\_1}) \times P_{fuel} \times S_{travel} \quad (3\text{-}7)$$

$$E_{37\_2} = \frac{1}{100} \times (\alpha_{37\_1}E_{31\_2} + \alpha_{37\_2}E_{32\_2} + \alpha_{37\_3}E_{33\_2}) \times P_{Bat} \times S_{travel} \quad (3\text{-}8)$$

$$E_{37} = E_{37\_1} + E_{37\_2} \quad (3\text{-}9)$$

Step 4: evaluating the driving cycle adaptability $E_4$ of the electromechanical coupling transmission, wherein the evaluation of the driving cycle adaptability is further analyzed based on the results calculated using the global optimal energy management strategy in step 31, including the number of switching times of working modes $E_{41}$, the number of the engine's startup times $E_{42}$, the proportion of distribution and utilization of working modes $E_{43}$, the evaluation of the degree of brake energy recovery and utilization $E_{44}$, and the number of charging and discharging times $E_{45}$;

Step 41 relates to the number of switching times of working modes $E_{41}$ in step 4; reading the working mode corresponding to each moment calculated by the global optimal energy management strategy in step 31, calculating the working modes of adjacent moments using a difference value method, wherein a zero difference indicates a same working mode, and a non-zero difference indicates different working modes; counting and recording the number of times the non-zero difference appears, which is the number of switching times of working modes of the electromechanical coupling transmission under corresponding operating conditions, as shown in formula (4-1); similarly, recording the number of switching times of working modes $E_{41\_1}$, $E_{41\_2}$, $E_{41\_3}$ and $E_{41\_4}$ under different operating conditions (standard, urban, suburban and high-speed driving cycle), $$E_{41} = \begin{cases} \text{Sum} = \text{Sum} + 0 \text{ if Mode } (t+1) - \text{Mode}(t) = = 0 \\ \text{Sum} = \text{Sum} + 1 \text{ if Mode } (t+1) - \text{Mode}(t) \sim = 0 \end{cases} \quad (4\text{-}1)$$

wherein Mode_s(t) represents the working mode at the moment t, and Mode_s(t+1) represents the working mode at the moment t+1;

Step 42 relates to the number of the engine's startup times $E_{42}$ in step 4; reading the working mode corresponding to each moment calculated by the global optimal energy management strategy in step 31, marking the working mode with the participation of engine as 1 and the working mode without the participation of engine as 0, and calculating the working modes of adjacent moments using a difference value method, wherein when the difference is 0, it indicates a same working mode, and when the difference is 1, it indicates the engine's startup state; subsequently, counting and recording the number of times that the difference is 1 appears, which is the number of engine's startup times of the electromechanical coupling transmission under corresponding operating conditions, as shown in formula (4-2); similarly, recording the number of engine's startup times $E_{42\_1}$, $E_{42\_2}$, $E_{42\_3}$ and $E_{42\_4}$ under different operating conditions (standard, urban, suburban and high-speed driving cycle), $$E_{42} = \begin{cases} \text{Sum} = \text{sum} + 0 \text{ if } ICE(t+1) - ICE(t) == 0 \\ \text{Sum} = \text{Sum} + 1 \text{ if } ICE(t+1) - ICE(t) = 1 \end{cases} \quad (4\text{-}2)$$

wherein ICE(t) represents the engine's startup state at the moment t, and ICE(t+1) represents the engine's startup state at the moment t+1;

Step 43 relates to the proportion of distribution and utilization of working modes $E_{43}$ in step 4; reading the working mode corresponding to each moment calculated by the global optimal energy management strategy in step 31, wherein different working modes have different marked states, including pure electric working mode (including different gears), series extend range working mode (including different gears), parallel charging working mode (including different gears), parallel driving working mode (including different gears), engine direct driving working mode (including different gears), and power split working mode; subsequently, counting the number of times that different working modes appear, and recording the proportion distribution of different working modes by comparing with the total number of times that the working modes appear, as shown in formula (4-3); similarly, recording the proportion distribution of working modes under different operating conditions (standard, urban, suburban and high-speed driving cycle), thereby further analyzing the rationality of utilizing working modes, $$E_{43\_y} = \frac{\text{Mode}(y)}{\text{Mode(Total)}} \quad (4\text{-}3)$$

wherein y represents different states of working modes, Mode(y) represents the number of times that different working modes appear, and Mode(Total) represents the total number of times that the working modes appear;

Step 44 relates to the evaluation of the degree of brake energy recovery and utilization $E_{44}$ in step 4; reading the time segment corresponding to the brake recovery working mode calculated by the global optimal energy management strategy in step 31, and statistically analyzing the energy recovery power $P_r$ in the time segment of brake recovery, as shown in formula (4-4); meanwhile, statistically analyzing and summing up the brake energy recovery power in different time segments under the target operating condition; further, performing a proportion analysis of the total power $P_T$ consumed under the target operating condition, as shown in formula (4-5), thereby determining the degree of energy recovery and utilization in the time segment of the target operating condition, $$P_r = \int_{t10}^{t11} T_{Mot} \times n_{Mot} \times \eta_{Mot}/9550 \quad (4\text{-}4)$$

$$E_{44} = \frac{\sum_{total} P_r}{P_T} \quad (4\text{-}5)$$

wherein $T_{Mot}$ represents the torque of the driving motor, $n_{Mot}$ represents the speed of the driving motor, $\eta_{Mot}$ represents the mechanical efficiency of the driving motor at the corresponding speed and torque, t10 represents the starting segment of brake energy recovery, t11 represents the ending segment of brake energy recovery, and E represents the ratio of brake energy recovery power to total power;

Step 45 relates to the number of charging and discharging times $E_{45\_1}$, distribution range of charging/discharging duration $E_{45\_2}$, and number of switching times of charging and discharging $E_{45\_3}$; reading the working mode corresponding to each moment calculated by the global optimal energy management strategy in step 31, wherein different working modes have different marked states; subsequently, marking the charging state working modes (series extend range 11, parallel charging 12 and brake energy recovery 13) as 10, marking the discharging state working mode (pure electric driving 21 and parallel driving 22) as 20, and marking the non-discharging working mode as 0; counting the number of times $E_{45\_1\_charge}/E_{45\_1\_discharge}$ corresponding to the charging/discharging state working modes, and calculating the distribution range of each charging/discharging duration $E_{45\_2\_charge}/E_{45\_2\_discharge}$ generating corresponding statistical charts during the evaluation process based on the data distribution; in addition, calculating the charging/discharging state of adjacent moments using a difference value method, wherein a zero difference indicates a same state, and a non-zero difference indicates a switching between charging and discharging; counting and recording the number of times that a non-zero difference appears, which is the number of switching times of charging and discharging under the corresponding operating conditions of the electromechanical coupling transmission, as shown in formula (4-6), $$E_{45\_3} = \begin{cases} \text{Sum} = \text{Sum} + 0 \text{ if } Bat(t+1) - Bat(t) == 0 \\ \text{Sum} = \text{Sum} + 1 \text{ if } Bat(t+1) - Bat(t) \sim = 0 \end{cases} \quad (4\text{-}6)$$

wherein Bat(t) represents a battery charging/discharging state at the moment t, and Bat(t+1) represents a battery charging/discharging state at the moment t+1;

Step 5: evaluating the rationality of the component feature parameters $E_5$; introducing different vehicle model parameters and evaluating whether the electromechanical coupling transmission matches the target vehicle model $E_{51}$; further, introducing all feature parameters such as dynamic source components, electrical components and mechanical components, performing matching checks, proofreading and rationality evaluation on the feature parameters of different components, and evaluating the rationality of the design scope of different feature parameters $E_{52}$; more specifically, the target vehicle model parameters include the vehicle weight (unloaded and fully loaded), windward area, tire radius, and rolling resistance coefficient, etc.; the engine feature parameters include the peak rotation speed, peak torque, and fuel/hydrogen consumption efficiency relationship, etc.; the feature parameters of the driving motor and generator include the motor type, peak/rated rotation speed, peak/rated torque, and motor mechanical efficiency relationship, etc.; the electronic control unit feature parameters include the mapping relationship of electronic control efficiency corresponding to different motor rotation speeds and torques; the battery component feature parameters include the battery capacity, number of batteries, connection way, and voltage and resistance variation relationship under different SoC states, etc.; the mechanical component feature parameters include number of different gears, number of gear teeth, definition of speed ratios between different gears, and parameters of clutches/brakes, etc.;

Step 51 relates to the evaluation of the matching performance between the electromechanical coupling transmission and the target vehicle model $E_{51}$ in step 5; using the global optimal energy management strategy in step 31 to traverse the parameters of different target vehicle models, obtaining the performances under different target vehicle model parameters based on the evaluation on dynamic performance, economic efficiency and driving cycle adaptability in steps 2-4, thereby evaluating the matching performance between the electromechanical coupling transmission and the target vehicle model;

Step 52 relates to the rationality evaluation of design scope of different feature parameters of the electromechanical coupling transmission $E_{52}$ in step 5; traversing the feature parameters of dynamic source components, electrical components and mechanical components of different electromechanical coupling transmissions using the global optimal energy management strategy in step 31, and obtaining the performances under the given target vehicle model parameters according to the evaluation on dynamic performance, economic efficiency and driving cycle adaptability in steps 2-4, thereby evaluating the rationality of the electromechanical coupling transmission under different component feature parameters;

Further, performing a preferred evaluation according to the target vehicle model parameters and the electromechanical coupling transmission feature parameters, wherein a single ordering or weight ordering is performed on indicators corresponding to steps 2-4 according to the economic efficiency, dynamic performance or driving cycle adaptability, thereby determining an effective electromechanical coupling transmission evaluation object;

Step 6: evaluating the structure and cost $E_6$; evaluating the structure of the determined electromechanical coupling transmission in step 5 (optional) includes the evaluation of structural complexity, compactness and enveloping space; in addition, performing an evaluation on the weight and cost of the electromechanical coupling transmission $E_{62}$, including the evaluation of the total weight/cost and item weight/cost, etc.;

Step 61 relates to the structural evaluation $E_{61}$ (optional) in step 6, including the evaluation of structural complexity, compactness, enveloping space and weight; in this step, three-dimensional modeling is performed on the electromechanical coupling transmission to further check whether the structural complexity, compactness and enveloping space of the electromechanical coupling transmission are reasonable;

Step 62 relates to the evaluation of weight $E_{62\_1}$ and cost $E_{62\_2}$ in step 6, including the evaluation of the item weight and item cost of the dynamic source components, the electrical components and the mechanical components of the electromechanical coupling transmission, wherein the dynamic source components include a fuel/hydrogen engine and other components capable of providing power, the electrical components include a driving motor, an generator and electronic control units, and the mechanical components include fixed shaft gears, planetary gears, clutches, brakes and synchronizers, etc.; further, performing a statistical analysis on the total weight and total cost of the electromechanical coupling transmission;

Step 7: performing a comprehensive evaluation; taking into account the evaluation of energy flow transfer path of the electromechanical coupling transmission $E_1$, the evaluation of dynamic performance $E_2$, the evaluation of economic efficiency $E_3$, the evaluation of driving cycle adaptability $E_4$, the evaluation of rationality of component feature parameters $E_5$ and the evaluation of structure and cost $E_6$, performing a comprehensive evaluation on the effective electromechanical coupling transmission evaluation object determined in step 5, and performing a key optimization on the electromechanical coupling transmission indicators concerned by an enterprise according to the target requirements of product design;

On one hand, the present invention proposes six categories and 20 sub-categories of indicators but fails to quickly and intuitively analyze the influence distribution of different indicators under different component feature parameters; by performing dimension reduction on the performance of the effective evaluation object determined in step 5 using a principal component analysis method, the number of principal components is determined; normally, three principal components are selected to perform a visual analysis, and the contribution rate of the accumulated interpretation of principal components should be as higher as possible, wherein the principal component indicator weight value $E_{\alpha\_z}$ is calculated as shown in formula (7-1); after determining the principal components, the correlation between each indicator and the corresponding principal component is analyzed, and the 20 sub-categories of indicators are decomposed into different principal components; the spatial distribution states of different evaluation indicators are further visually observed through a three-dimensional quadrant graph, and the performances of different effective electromechanical coupling transmission evaluation objects are determined;

$$E_{\alpha\_Z} = \frac{\sigma_{\alpha\_z}}{\sum \sigma_{\alpha\_z}} \tag{7-1}$$

wherein z represents different categories of indicators, $\sigma_{\alpha\_z}$ represents a variance interpretation rate corresponding to different indicators, and $\Sigma\sigma_{\alpha\_t}$ represents an accumulated variance interpretation rate of corresponding indicators;

On the other hand, according to the principal component analysis, determining evaluation indicators with poor performance results, newly adding as items into the target functions in the global optimal energy management strategy in step 31 and repeatedly performing iterative optimization; subsequently, repeatedly performing steps 1-6 to perform new rounds of configuration evaluation of electromechanical coupling transmission; finally, generating evaluation result tables of different rounds of evaluation of electromechanical coupling transmission until different evaluation indicators meet the requirements of product design and development, thereby completing the evaluation.

A platform for implementing the configuration evaluation method for electromechanical coupling transmission of hybrid electric vehicles, comprising:

An energy flow transfer path evaluation module for evaluating the energy flow transfer path in step 1: determining an energy flow transfer path of a configuration to be evaluated, including a pure electric working mode, a series extend range working mode, a parallel charging mode, an engine direct driving mode, a parallel driving mode and a power split working mode; performing kinematic and mechanical analysis on different energy flow transfer paths, determining a rotation speed and torque matching relationship between all components and the engine, driving motor and generator, and performing performance and risk assessments from the perspectives of kinematics and mechanics;

An electromechanical coupling transmission dynamic performance evaluation module for evaluating the dynamic performance of electromechanical coupling transmission in step 2: evaluating the dynamic performances corresponding to different working modes determined in step 1, comprising calculating the acceleration time under an independent working mode and a joint working mode of the engine and driving motor, as well as the maximum climbing degree and the maximum speed that can be reached;

An electromechanical coupling transmission economic efficiency evaluation module for evaluating the economic efficiency of electromechanical coupling transmission in step 3:

constructing a global optimal energy management strategy to evaluate the energy consumption of the electromechanical coupling transmission, and testing the energy consumption of the electromechanical coupling transmission in a balanced state maintained by the battery SoC, the energy consumption from the SoC maximum limit state to the minimum limit state, and the energy consumption in a power shortage state, thereby calculating the fuel consumption and power consumption per hundred kilometers of the electromechanical coupling transmission, the pure electric endurance mileage, the operating high-efficiency area ratio of the engine, driving motor and generator, and the carbon emission data, and predicting an energy consumption cost in each year of travel;

An electromechanical coupling transmission driving cycle adaptability evaluation module for evaluating the driving cycle adaptability of electromechanical coupling transmission in step 4: further analyzing based on the results calculated by the global optimal energy management strategy in step 3, including the number of switching times of the working modes, the number of engine's startup times, the distribution utilization ratio of operation modes, the brake energy recovery degree, and the number of times of charging and discharging;

A component feature parameter rationality evaluation module for evaluating the rationality of component feature parameters in step 5: introducing different vehicle model parameters, and evaluating whether the electromechanical coupling transmission matches the target vehicle model; introducing all the feature parameters, performing matching checks, proofreading and rationality evaluation on the feature parameters of different components, and performing rationality evaluation on the design scope of different feature parameters;

A structure and cost evaluation module for evaluating the structure and cost in step 6:

evaluating the structure of the electromechanical coupling transmission determined in step 5, including the structural complexity, compactness and enveloping space; evaluating the weight and cost of the electromechanical coupling transmission, including the total weight/cost and item weight/cost, and A comprehensive evaluation module for performing a comprehensive evaluation in step 7: taking into account the evaluation of energy flow transfer path of the electromechanical coupling transmission, the evaluation of dynamic performance, the evaluation of economic efficiency, the evaluation of driving cycle adaptability, the evaluation of rationality of component feature parameters and the evaluation of structure and cost in steps 1-6, performing a comprehensive evaluation on the effective electromechanical coupling transmission evaluation object determined in step 5, and performing a key optimization on the electromechanical coupling transmission indicators according to the target requirements of product design.

The above are merely preferred embodiments of the present invention, and there may be combinations of different configurations and feature parameters. The embodiments of the present invention merely show exemplary parameters and are not intended to limit the present invention. For those skilled in the art, the present invention may have various modifications and variations. Therefore, any modifications, equivalent replacements and improvement made within the spirit and principles of the present invention shall fall into the scope defined by the claims of the present invention.

The invention claimed is:

1. A configuration evaluation method for electromechanical coupling transmission of hybrid electric vehicles, comprising:

step 1: evaluating an energy flow transfer path: determining an energy flow transfer path of a configuration to be evaluated, including a pure electric working mode, a series extend range working mode, a parallel charging mode, an engine direct driving mode, a parallel driving mode and a power split working mode; performing kinematic and mechanical analysis on different energy flow transfer paths, determining a rotation speed and torque matching relationship between all components and the engine, driving motor and generator, and performing performance and risk assessments from the perspectives of kinematics and mechanics;

step 2: evaluating the dynamic performance of electromechanical coupling transmission:

evaluating the dynamic performances corresponding to different working modes determined in step 1, comprising calculating the acceleration time under an independent working mode and a joint working mode of the engine and driving motor, as well as the maximum climbing degree and the maximum speed that can be reached;

step 3: evaluating the economic efficiency of electromechanical coupling transmission:

constructing a global optimal energy management strategy to evaluate the energy consumption of the electromechanical coupling transmission, and testing the energy consumption of the electromechanical coupling transmission in a balanced state maintained by the battery SoC, the energy consumption from the SoC maximum limit state to the minimum limit state, and the energy consumption in a power shortage state, thereby calculating the fuel consumption and power consumption per hundred kilometers of the electromechanical coupling transmission, the pure electric endurance mileage, the operating high-efficiency area ratio of the engine, driving motor and generator, as well as the carbon emission data, and predicting an energy consumption cost in each year of travel;

step 4: evaluating the driving cycle adaptability of electromechanical coupling transmission: further analyzing based on the results calculated by the global optimal energy management strategy in step 3, including the number of switching times of the working modes, the number of engine's startup times, the distribution utilization ratio of operation modes, the brake energy recovery degree, and the number of times of charging and discharging;

step 5: evaluating the rationality of component feature parameters: introducing different vehicle model parameters, and evaluating whether the electromechanical coupling transmission matches the target vehicle model; introducing all the feature parameters, performing matching checks, proofreading and rationality evaluation on the feature parameters of different components, and performing rationality evaluation on the design scope of different feature parameters;

step 6: evaluating the structure and cost: evaluating the structure of the electromechanical coupling transmission determined in step 5, including the structural complexity, compactness and enveloping space; evaluating the weight and cost of the electromechanical coupling transmission, including the total weight/cost and item weight/cost;

step 7: performing a comprehensive evaluation: taking into account the evaluation of energy flow transfer path of the electromechanical coupling transmission, the evaluation of dynamic performance, the evaluation of economic efficiency, the evaluation of driving cycle adaptability, the evaluation of rationality of component feature parameters and the evaluation of structure and cost in steps 1-6, performing a comprehensive evaluation on the effective electromechanical coupling transmission evaluation object determined in step 5, and performing a key optimization on the electromechanical coupling transmission indicators according to the target requirements of product design;

step 3 further comprising:

step 31: constructing a global optimal energy management strategy: first, determining a target driving cycle, and selecting different driving cycles for adaptive combination, wherein each moment corresponds to a state variable $x_t$ and a control variable $u_t$, $f_t(x_t,u_t)$ indicates that there is a unique corresponding relationship between the state variable and the control variable, wherein as shown in formula (3-1), the state variable $x_t$ comprises a battery SoC working mode and an electromechanical coupling transmission working mode, and the control variable $u_t$ comprises the rotation speed and torque of the engine, as well as the rotation speed and the torque of the driving motor; second, determining an optimal control sequence u* of an accumulated objective function J by using a time reversal method, as shown in formula (3-2), calculating and storing a corresponding instantaneous cost function $\Gamma_t$ after combining all state variables and control variables within each time step length, calculating an accumulated cost value, and determining an optimal control sequence by minimizing the accumulated cost, wherein the references of the accumulated objective function in this step are set ideal values of the minimum fuel consumption and the battery SoC target value, and subsequently, a multi-objective optimization may be performed according to the feedback of the evaluation indicators; finally, performing a forward operation under a target driving cycle using the optimal control sequence, thereby obtaining an instantaneous fuel consumption and power consumption of the electromechanical coupling transmission at each moment, and subsequently, obtaining the hundred-kilometer fuel consumption $Q_T$ according to the total fuel consumption $m_T$ and the accumulated driving mileage S corresponding to the operating condition, as shown in formula (3-3), $$x_{t+1} = f_t(x_t, u_t) \tag{3-1}$$

$$J(x_0) = \min_u J(x_0, u^*) = \Gamma_t(x_t) + \sum_{t=1}^{t-1} \Gamma_t(x_t, u_t) \tag{3-2}$$

$$Q_T = \frac{m_T}{1000 \; \rho S} \times 100 \tag{3-3}$$

wherein t represents a time step length of the target operating condition, $J(x_0)$ represents an accumulated objective function corresponding to the optimal control sequence u* starting from an initial condition $x_0$, $\Gamma$ represents an instantaneous cost function, wherein the corresponding optimal control sequence is solved when the accumulated objective function is minimized, wherein $\rho$ represents the gasoline density, and S represents the accumulated mileage of travel;

step 32: performing an energy consumption test by respectively giving an initial state value and a final state value of the SoC, wherein the initial value and the final value of the SoC set in a balanced state maintained by the battery SoC are usually set to be 0.5, wherein for the energy consumption from the SoC maximum limit value state to the minimum limit value state, the initial value and the final value of the SoC are usually set to be 0.7 and 0.3, wherein for the power consumption in a power shortage state, the initial value and the final value of the SoC are both set to be 0.3;

step 33: after the target driving cycle is given, setting the initial value of the battery SoC to be the maximum limit value state, and making the operating condition cycle using only the pure electric working mode until the final state of the SoC reaches the minimum limit state, and subsequently, respectively recording the pure electric endurance mileages $E_{34\_1}$, $E_{34\_2}$, $E_{34\_3}$ and $E_{34\_4}$ of the electromechanical coupling transmission under different driving cycles including standard, urban, suburban and high-speed driving cycle, wherein the sum of the operating condition weights $\alpha_{34\_1}$, $\alpha_{34\_2}$, $\alpha_{34\_3}$ and $\alpha_{34\_4}$ is 1, and the weights may be adaptively adjusted according to the design requirements, thereby obtaining an accumulated mileage by final weighting, namely, the pure electric endurance mileage $E_{34}$, as shown in formula (3-4):

$$E_{34} = \alpha_{34\_1}E_{34\_1} + \alpha_{34\_2}E_{34\_2} + \alpha_{34\_3}E_{34\_3} + \alpha_{34\_4}E_{34\_4} \quad (3\text{-}4);$$

step 34: calculating the proportions of high efficiency operation areas of the engine, the driving motor and the generator: as shown in formula (3-5); reading the rotation speeds and torques of the engine, the driving motor and the generator in the optimal control sequence in step 31, drawing operating points on an efficiency map corresponding to the engine, the driving motor and the generator, counting the operating points of the engine in the top 20% percentile of the highest and lowest efficiency areas, and using it as the proportion $E_{35\_1}$ of high efficiency operation area of the engine; similarly, counting the operating points of the driving motor and the generator in the top 20% percentile of the highest and lowest efficiency areas, and using them as the proportions $E_{35\_2}$ and $E_{35\_3}$ of high efficiency operation areas of the driving motor and the generator, $$E_{35\_f} = \text{find}(\text{Map}_f(n_f, T_f)_{(0\text{-}20\%)}) \quad (3\text{-}5)$$

wherein f=1, 2, 3 represents different power sources, including the engine, the driving motor and the generator, $n_f$ represents rotation speeds corresponding to different power sources, and $T_f$ represents torques corresponding to different power sources;

step 35: calculating the carbon emission data $E_{36}$: according to the hundred-kilometer fuel consumptions $E_{31\_1}$, $E_{32\_1}$, and $E_{33\_1}$ under three different battery SoC state scenarios obtained in step 31, and the sum of the weights $\alpha_{36\_1}$, $\alpha_{36\_2}$, and $\alpha_{36\_3}$ of the three scenarios corresponding to the operating conditions is 1, adaptively adjusting the weights based on the design requirements, and by multiplying with the carbon emission coefficient $K_{co2}$ per liter of gasoline and the estimated annual mileage of travel, thereby obtaining the carbon emission data of the target vehicle model, as shown in formula (3-6):

$$E_{36} = \frac{1}{100} \times (\alpha_{36\_1}E_{31\_1} + \alpha_{36\_2}E_{32\_1} + \alpha_{36\_3}E_{33\_1}) \times K_{co2} \quad (3\text{-}6)$$

step 36: predicting the energy consumption cost $E_{37}$ in each year of travel, including the fuel consumption cost and power consumption cost: according to the hundred-kilometer fuel consumptions $E_{31\_1}$, $E_{32\_1}$, and $E_{33\_1}$ under three different battery SoC state scenarios obtained in step 31, and the sum of the weights $\alpha_{37\_1}$, $\alpha_{37\_2}$, and $\alpha_{37\_3}$ of the three scenarios corresponding to the operating conditions is 1, adaptively adjusting the weights based on the design requirements, and by multiplying with the cost price per liter of gasoline $P_{fuel}$ and the estimated annual mileage of travel $S_{travel}$, thereby obtaining the fuel consumption cost $E_{37\_1}$, as shown in formula (3-7), wherein similarly, according to the power consumptions corresponding to $E_{31\_2}$, $E_{32\_2}$ and $E_{33\_2}$, and the sum of the weights $\alpha_{37\_1}$, $\alpha_{37\_2}$, and $\alpha_{37\_3}$ of the three scenarios corresponding to the operating conditions is 1, adaptively adjusting the weights based on design requirements, and by multiplying with the cost price per kWh of electricity $P_{Bat}$ with the estimated annual mileage of travel $S_{travel}$, thereby obtaining the power consumption cost $E_{37\_2}$, as shown in formula (3-8), wherein the total energy consumption cost is shown in (3-9):

$$E_{37\_1} = \frac{1}{100} \times (\alpha_{37\_1}E_{31\_1} + \alpha_{37\_2}E_{32\_1} + \alpha_{37\_3}E_{33\_1}) \times P_{fuel} \times S_{travel} \quad (3\text{-}7)$$

$$E_{37\_2} = \frac{1}{100} \times (\alpha_{37\_1}E_{31\_2} + \alpha_{37\_2}E_{32\_2} + \alpha_{37\_3}E_{33\_2}) \times P_{Bat} \times S_{travel} \quad (3\text{-}8)$$

$$E_{37} = E_{37\_1} + E_{37\_2} \quad (3\text{-}9)$$

step 4 further comprising:

step 41: calculating the number of switching times of working modes $E_{41}$: reading the working mode corresponding to each moment calculated by the global optimal energy management strategy in step 31, calculating the working modes of adjacent moments using a difference value method, wherein a zero difference indicates a same working mode, and a non-zero difference indicates different working modes; counting and recording the number of times the non-zero difference appears, which is the number of switching times of working modes of the electromechanical coupling transmission under corresponding operating conditions, as shown in formula (4-1); similarly, recording the number of switching times of working modes $E_{41\_1}$, $E_{41\_2}$, $E_{41\_3}$ and $E_{41\_4}$ under different operating conditions including standard, urban, suburban and high-speed driving cycle, $$E_{41} = \begin{cases} \text{Sum} = \text{Sum}+0 & \text{if } \text{Mode}(t+1)-\text{Mode}(t) == 0 \\ \text{Sum} = \text{Sum}+1 & \text{if } \text{Mode}(t+1)-\text{Mode}(t) \sim = 0 \end{cases} \quad (4\text{-}1)$$

wherein Mode_s(t) represents the working mode at the moment t, and Mode_s(t+1) represents the working mode at the moment t+1;

step 42: calculating the number of the engine's startup times $E_{42}$: reading the working mode corresponding to each moment calculated by the global optimal energy management strategy in step 31, marking the working mode with the participation of engine as 1 and the working mode without the participation of engine as 0, and calculating the working modes of adjacent moments using a difference value method, wherein when the difference is 0, it indicates a same working mode, and when the difference is 1, it indicates the engine's startup state; subsequently, counting and recording the number of times that the difference is 1 appears, which is the number of engine's startup times of the electromechanical coupling transmission under corresponding operating conditions, as shown in formula (4-2); similarly, recording the number of engine's startup times $E_{42\_1}$, $E_{42\_2}$, $E_{42\_3}$ and $E_{42\_4}$ under different operating conditions (standard, urban, suburban and high-speed driving cycle), $$E_{42} = \begin{cases} \text{Sum} = \text{Sum}+0 & \text{if } ICE(t+1)-ICE(t) == 0 \\ \text{Sum} = \text{Sum}+1 & \text{if } ICE(t+1)-ICE(t) == 1 \end{cases}, \quad (4\text{-}2)$$

wherein ICE(t) represents the engine's startup state at the moment t, and ICE(t+1) represents the engine's startup state at the moment t+1;

step 43: calculating the proportion of distribution and utilization of working modes $E_{43}$: reading the working mode corresponding to each moment calculated by the global optimal energy management strategy in step 31, wherein different working modes have different marked states; subsequently, counting the number of times that different working modes appear, and recording the proportion of distribution of different working modes by comparing with the total number of times that the working modes appear, as shown in formula (4-3); similarly, recording the proportion of distribution of working modes under different operating conditions including standard, urban, suburban and high-speed driving cycle;

$$E_{43\_y} = \frac{\text{Mode}(y)}{\text{Mode}(\text{Total})} \quad (4\text{-}3)$$

wherein y represents different states of working modes, Mode(y) represents the number of times that different working modes appear, and Mode(Total) represents the total number of times that the working modes appear;

step 44: evaluating the degree of brake energy recovery and utilization $E_{44}$ in step 4; reading the time segment corresponding to the brake recovery working mode calculated by the global optimal energy management strategy in step 31, and statistically analyzing the energy recovery power $P_r$ in the time segment of brake recovery, as shown in formula (4-4); meanwhile, statistically analyzing and summing up the brake energy recovery power in different time segments under the target operating condition; further, performing a proportion analysis of the total power $P_T$ consumed under the target operating condition, as shown in formula (4-5), thereby determining the degree of energy recovery and utilization in the time segment of the target operating condition, $$P_r = \int_{t10}^{t11} T_{Mot} \times n_{Mot} \times \eta_{Mot}/9550 \quad (4\text{-}4)$$

$$E_{44} = \frac{\sum_{total} P_r}{P_T} \quad (4\text{-}5)$$

wherein $T_{Mot}$ represents the torque of the driving motor, $n_{Mot}$ represents the speed of the driving motor, $\eta_{Mot}$ represents the mechanical efficiency of the driving motor at the corresponding speed and torque, t10 represents the starting segment of brake energy recovery, t11 represents the ending segment of brake energy recovery, and $E_{44}$ represents the ratio of brake energy recovery power to total power;

step 45: calculating the number of charging and discharging times $E_{45\_1}$, distribution range of charging/discharging duration $E_{45\_2}$, and number of switching times of charging and discharging $E_{45\_3}$: reading the working mode corresponding to each moment calculated by the global optimal energy management strategy in step 31, wherein different working modes have different marked states; subsequently, marking the charging state working modes as 10, marking the discharging state working mode as 20, and marking the non-discharging working mode as 0; counting the number of times $E_{45\_1\_charge}/E_{45\_1\_discharge}$ corresponding to the charging/discharging state working modes, and calculating the distribution range of each charging/discharging duration $E_{45\_2\_charge}/E_{45\_2\_discharge}$; in addition, calculating the charging/discharging state of adjacent moments using a difference value method, wherein a zero difference indicates a same state, and a non-zero difference indicates a switching between charging and discharging; counting and recording the number of times that a non-zero difference appears, which is the number of switching times of charging and discharging under the corresponding operating conditions of the electromechanical coupling transmission, as shown in formula (4-6), $$E_{45\_3} = \begin{cases} \text{Sum} = \text{Sum}+0 & \text{if } \text{Bat}(t+1)-\text{Bat}(t) == 0 \\ \text{Sum} = \text{Sum}+1 & \text{if } \text{Bat}(t+1)-\text{Bat}(t) \sim = 0 \end{cases} \quad (4\text{-}6)$$

wherein Bat(t) represents a battery charging/discharging state at the moment t, and Bat(t+1) represents a battery charging/discharging state at the moment t+1.

2. The configuration evaluation method of claim 1, wherein step 1 further comprising:

step 11: evaluating the kinematic and mechanical bearing capacity of individual components: traversing and combining the maximum rotation speed, maximum torque and maximum power of the engine and driving motor/generator, taking them as the inputs, and determining the maximum speed and maximum torque that different components can bear under different working modes based on the speed ratio relationship of energy flow transfer paths, as shown in formula (1-1), $$\begin{cases} n_{e\_x\_max} = n_{e\_max} \times i_{x\_e} \\ T_{e\_x\_max} = T_{e\_max}/i_{x\_e} \end{cases} \quad (1\text{-}1)$$

$$\begin{cases} n_{M\_x\_max} = n_{M\_max} \times i_{x\_M} \\ T_{M\_x\_max} = T_{M\_max}/i_{x\_M} \end{cases}$$

$$\begin{cases} n_{G\_x\_max} = n_{G\_max} \times i_{x\_G} \\ T_{G\_x\_max} = T_{G\_max}/i_{x\_G} \end{cases}$$

wherein $n_{e\_x\_max}$ represents a maximum speed that can be borne by different components in an independent working mode of the engine, $n_{M\_x\_max}$ represents a maximum speed that can be borne by different components in an independent working mode of the driving motor, $n_{G\_x\_max}$ represents a maximum speed that can be borne by different components in an independent working mode of the generator, $T_{e\_x\_max}$ represents a maximum torque that can be borne by different components in an independent working mode of the engine, $T_{M\_x\_max}$ represents a maximum torque that can be borne by different components in an independent working mode of the driving motor, $T_{G\_x\_max}$ represents a maximum torque that can be borne by different components in an independent working mode of the generator, $n_{e\_max}$, $n_{M\_max}$ and $N_{G\_max}$ respectively represent a maximum speed that the engine, the driving motor and the generator can reach, $T_{e\_max}$, $T_{M\_max}$ and $T_{G\_max}$ respectively represent a maximum torque that the engine, the driving motor and the generator can reach, and $i_{x\_e}$, $i_{x\_M}$ and $i_{x\_G}$ respectively represent a speed ratio relationship between different components and the engine, the driving motor and the generator;

step 12: evaluating the kinematic and mechanical bearing capacities of adjacent components: encoding the components in the energy flow transfer paths under different working modes, traversing and combining the given operation limit states (maximum speed/maximum torque/maximum power) of the power source under different working modes, traversing and calculating the rotation speed and torque of adjacent components in the energy flow transfer paths, analyzing the relationships between the relative rotation speed Δn and the relative torque ΔT between adjacent components, and evaluating the relationships between adjacent components in kinematics and mechanics, wherein this process further includes evaluating whether the decoupling and non-decoupling states as well as the kinematic and mechanical relationships of the rotation speed and torque are within a reasonable operation range and whether there is a risk state, as shown in formulas (1-2):

$$\begin{cases} (\Delta n = n_{x\_1} - n_{x\_2}) < n_{1\_2} \\ (\Delta T = T_{x\_1} - T_{x\_2}) < T_{1\_2} \end{cases} \quad (1\text{-}2)$$

wherein $n_{x\_1}$ and $T_{x\_1}$ respectively represent the rotation speed and torque of the first component in the adjacent components in the energy flow transfer paths, $n_{x\_2}$ and $T_{x\_2}$ respectively represent the rotation speed and torque of the second component in the adjacent components, and $n_{1\_2}/T_{1\_2}$ respectively represent the relative rotation speed and torque limits that the components can bear;

step 13: evaluating the instantaneous bearing capacities of components when switching between different working modes, setting operation states of the power source when switching between different working modes, giving a reasonable switching duration Δt of working modes, and determining the transient bearing capacities of different components during the working mode switching process, determining whether the variation of the relationship between the rotation speed and torque leads to significant impacts on different components, and determining whether there are risk effects on different components, as shown in formulas (1-3):

$$\begin{cases} \Delta n/\Delta t = (n_{x\_1} - n_{x\_2})/\Delta t \\ \Delta T/\Delta t = (T_{x\_1} - T_{x\_2})/\Delta t \end{cases} \quad (1\text{-}3)$$

step 14: comprehensively evaluating the energy flow transfer paths $E_1$, thereby generating a bearing capacity evaluation table corresponding to different components in energy flow transfer paths under different working modes; meanwhile, evaluating whether the configuration connection mode of electromechanical coupling transmission can be further optimized, thereby ensuring that the energy flow transfer paths reach a reasonable grade; if not, adjusting the reference parameters of the electromechanical coupling transmission.

3. The configuration evaluation method of claim 2, wherein step 2 further comprising:

step 21: calculating the acceleration time: calculating the acceleration time in an independent working mode: traversing a maximum acceleration state $a_{xmax}$ corresponding to a maximum driving force $F_{xmax}$ output by the electromechanical coupling transmission in different speed states in the independent working mode, and traversing and calculating a minimum acceleration time required under different acceleration states; calculating the acceleration time in a joint working mode: traversing a maximum acceleration state $a'_{xmax}$ corresponding to a maximum driving force $F'_{xmax}$ jointly provided by the engine and the driving motor and output by the electromechanical coupling transmission in different speed states in the joint independent working mode, and traversing and calculating a minimum acceleration time required under different acceleration states; finally, judging and recording the maximum driving force and the maximum acceleration output by the electromechanical coupling transmission in each speed state in the independent working mode and the joint working mode, and calculating the minimum acceleration time of the electromechanical coupling transmission under different acceleration states, as shown in formulas (2-1), (2-2) and (2-3), $$t_{0\text{-}60} = \int_0^{60} \frac{1}{a_{xmax}} du \quad (2\text{-}1)$$

$$t_{0\text{-}100} = \int_0^{100} \frac{1}{a_{xmax}} du \quad (2\text{-}2)$$

$$t_{80\text{-}120} = \int_{80}^{120} \frac{1}{a_{xmax}} du \quad (2\text{-}3)$$

$$t_{t0\text{-}t1} = \int_{t0}^{t1} 1/\text{find}(\max(a_{ICE,t0\text{-}t1}), (a_{Mot,t0\text{-}t1}), (a_{ICE\text{-}Mot,t0\text{-}t1})) \quad (2\text{-}4)$$

wherein $t_{0\text{-}60}$, $t_{0\text{-}100}$ and $t_{80\text{-}120}$ respectively represent acceleration times at 0-60 km/h, 0-100 km/h and 80-120 km/h in an independent working mode, $t'_{0\text{-}60}$, $t'_{0\text{-}100}$ and $t'_{80\text{-}120}$ respectively represent acceleration times at 0-60 km/h, 0-100 km/h and 80-120 km/h in a joint working mode, $t_{t0\text{-}t1}$ represents the acceleration time under t0-t1, $a_{ICE,t0\text{-}t1}$ represents the maximum acceleration state corresponding to the maximum driving force provided by the engine within time t0-t1, $a_{Mot,t0\text{-}t1}$ represents the maximum acceleration state corresponding to the maximum driving force provided by the driving motor within the time t0-t1, $a_{ICE\text{-}Mot,t0\text{-}t1}$ represents the maximum acceleration state corresponding to the maximum driving force provided by the joint driving of the engine and the driving motor within time t0-t1, and formula (2-4) represents finding the maximum acceleration state corresponding to the maximum driving force that can be provided under different working modes at each moment;

step 22: calculating the maximum climbing degree $i_{max}$: as shown in formulas (2-5) and (2-6), ensuring that the maximum driving force $F_{xmax}*$ provided by the electromechanical coupling transmission when rolling resistance $F_f$ and wind resistance $F_w$ are overcome under different working modes; traversing the gradient resistance $F_g$ borne by different speed states $V_t$ under different slope gradients until the maximum driving force $F_{xmax}*$ provided by the electromechanical coupling transmission in this speed state is equal to the borne resistance, wherein the corresponding slope gradient is the maximum slope gradient that can be reached by the electromechanical coupling transmission, $$\alpha_{max} = \arcsin\left(\frac{F_{xgmax} - (F_f + F_w + F_g)}{G}\right) \quad (2\text{-}5)$$

$$i_{max} = \text{find}(\tan(\alpha_{max})) \quad (2\text{-}6)$$

wherein $\alpha_{max}$ represents a maximum slope angle, and G represents the gravity;

step 23: calculating the maximum speed: traversing and calculating the maximum driving forces $F_{emax}$ and $F_{mmax}$ independently provided by the engine and the driving motor in each speed state, and the maximum driving force $F_{e\text{-}mmax}$ provided by the joint driving of the engine and the driving motor, and comparing, determining and recording the maximum driving force $F_{xmax}$ output by the electromechanical coupling transmission in the three driving states; meanwhile, traversing and calculating the external resistance $F_{dmax}$ borne at each moment in each speed state, including the rolling resistance $F_f$, wind resistance $F_w$, gradient resistance $F_g$ and acceleration resistance $F_a$; further, gradually determining the numerical value relationship of between the driving force and the external resistance in the speed state V at each moment until the external resistance $F_{dmax}$ is just greater than the speed state corresponding to the driving force $F_{fmax}$, namely, this speed state being the maximum limit speed state $V_{high}$ that the electromechanical coupling transmission can reach:

$$V_{high} = \text{find}(V_t(F_{fmax} > F_{dmax})) \quad (2\text{-}7).$$

4. The configuration evaluation method of claim 3, wherein step 5 further comprising:

step 51: evaluating the matching performance between the electromechanical coupling transmission and the target vehicle model $E_{51}$: using the global optimal energy management strategy in step 31 to traverse the parameters of different target vehicle models, obtaining the performances under different target vehicle model parameters based on the evaluation on dynamic performance, economic efficiency and driving cycle adaptability in steps 2-4, thereby evaluating the matching performance between the electromechanical coupling transmission and the target vehicle model;

step 52: evaluating the rationality of design scope of different feature parameters of the electromechanical coupling transmission $E_{52}$: traversing the feature parameters of dynamic source components, electrical components and mechanical components of different electromechanical coupling transmissions using the global optimal energy management strategy in step 31, and obtaining the performances under the given target vehicle model parameters according to the evaluation on dynamic performance, economic efficiency and driving cycle adaptability in steps 2-4, thereby evaluating the rationality of the electromechanical coupling transmission under different component feature parameters, wherein the target vehicle model parameters include the vehicle weight, windward area, tire radius, and rolling resistance coefficient, the engine feature parameters include the peak rotation speed, peak torque, and fuel/hydrogen consumption efficiency relationship, the feature parameters of the driving motor and generator include the motor type, peak/rated rotation speed, peak/rated torque and motor mechanical efficiency relationship, and the mechanical component feature parameters include number of different gears, number of gear teeth, definition of speed ratios between different gears, and parameters of clutches/brakes.

5. The configuration evaluation method of claim 4, wherein step 5 further comprising:

performing screening and evaluation according to the target vehicle model parameters and the electromechanical coupling transmission feature parameters; performing a single ordering or weight ordering on indicators corresponding to steps 2-4 according to the economic efficiency, dynamic performance or driving cycle adaptability, thereby determining an effective electromechanical coupling transmission evaluation object.

6. The configuration evaluation method of claim 5, wherein step 6 further comprising:

step 61: evaluating the structure $E_6$: evaluating the structural complexity, compactness, enveloping space and weight; performing three-dimensional modeling on the electromechanical coupling transmission to further check whether the structural complexity, compactness and enveloping space of the electromechanical coupling transmission are reasonable;

step 62: evaluating the weight $E_{62\_1}$ and cost $E_{62\_2}$: evaluating the item weight and item cost of the dynamic source components, the electrical components and the mechanical components of the electromechanical coupling transmission, wherein the dynamic source components include a fuel/hydrogen engine and other components capable of providing power, the electrical components include a driving motor, an generator and electronic control units, and the mechanical components include fixed shaft gears, planetary gears, clutches, brakes and synchronizers; further, performing a statistical analysis on the total weight and total cost of the electromechanical coupling transmission.

7. The configuration evaluation method of claim 6, wherein step 7 further comprising:

performing dimension reduction on the performance of the effective evaluation object determined in step 5 using a principal component analysis method, thereby determining the number of principal components, wherein the calculation of the principal component indicator weight value $E_{\alpha\_z}$ is shown in formula (7-1); after determining the principal components, analyzing the correlation between each indicator and the corresponding principal component, and decomposing the 20 sub-categories of indicators into different principal components; visually observing the spatial distribution states of different evaluation indicators through a three-dimensional quadrant graph, thereby determining the performances of different effective electromechanical coupling transmission evaluation objects, $$E_{\alpha\_Z} = \frac{\sigma_{\alpha\_z}}{\sum \sigma_{\alpha\_z}} \quad (7\text{-}1)$$

wherein z represents different categories of indicators, $\sigma_{\alpha\_z}$ represents a variance interpretation rate corresponding to different indicators, and $\Sigma\sigma_{\alpha\_z}$ represents an accumulated variance interpretation rate of corresponding indicators; according to the principal component analysis, determining evaluation indicators with poor performance results, newly adding as items into the target functions in the global optimal energy management strategy in step 31 and repeatedly performing iterative optimization;

subsequently, repeatedly performing steps 1-6 to perform new rounds of configuration evaluation of electromechanical coupling transmission; finally, generating evaluation result tables of different rounds of evaluation of electromechanical coupling transmission until different evaluation indicators meet the requirements of product design and development, thereby completing the evaluation.

8. A platform for implementing the configuration evaluation method for electromechanical coupling transmission of hybrid electric vehicles of claim 1, comprising:

an energy flow transfer path evaluation module for evaluating the energy flow transfer path in step 1, an electromechanical coupling transmission dynamic performance evaluation module for evaluating the dynamic performance of electromechanical coupling transmission in step 2, an electromechanical coupling transmission economic efficiency evaluation module for evaluating the economic efficiency of electromechanical coupling transmission in step 3, an electromechanical coupling transmission driving cycle adaptability evaluation module for evaluating the driving cycle adaptability of electromechanical coupling transmission in step 4, a component feature parameter rationality evaluation module for evaluating the rationality of component feature parameters in step 5, a structure and cost evaluation module for evaluating the structure and cost in step 6, and a comprehensive evaluation module for performing a comprehensive evaluation in step 7.

9. A platform for implementing the configuration evaluation method for electromechanical coupling transmission of hybrid electric vehicles of claim 2, comprising:

an energy flow transfer path evaluation module for evaluating the energy flow transfer path in step 1, an electromechanical coupling transmission dynamic performance evaluation module for evaluating the dynamic performance of electromechanical coupling transmission in step 2, an electromechanical coupling transmission economic efficiency evaluation module for evaluating the economic efficiency of electromechanical coupling transmission in step 3, an electromechanical coupling transmission driving cycle adaptability evaluation module for evaluating the driving cycle adaptability of electromechanical coupling transmission in step 4, a component feature parameter rationality evaluation module for evaluating the rationality of component feature parameters in step 5, a structure and cost evaluation module for evaluating the structure and cost in step 6, and a comprehensive evaluation module for performing a comprehensive evaluation in step 7.

10. A platform for implementing the configuration evaluation method for electromechanical coupling transmission of hybrid electric vehicles of claim 3, comprising:

an energy flow transfer path evaluation module for evaluating the energy flow transfer path in step 1, an electromechanical coupling transmission dynamic performance evaluation module for evaluating the dynamic performance of electromechanical coupling transmission in step 2, an electromechanical coupling transmission economic efficiency evaluation module for evaluating the economic efficiency of electromechanical coupling transmission in step 3, an electromechanical coupling transmission driving cycle adaptability evaluation module for evaluating the driving cycle adaptability of electromechanical coupling transmission in step 4, a component feature parameter rationality evaluation module for evaluating the rationality of component feature parameters in step 5, a structure and cost evaluation module for evaluating the structure and cost in step 6, and a comprehensive evaluation module for performing a comprehensive evaluation in step 7.

11. A platform for implementing the configuration evaluation method for electromechanical coupling transmission of hybrid electric vehicles of claim 4, comprising:

an energy flow transfer path evaluation module for evaluating the energy flow transfer path in step 1, an electromechanical coupling transmission dynamic performance evaluation module for evaluating the dynamic performance of electromechanical coupling transmission in step 2, an electromechanical coupling transmission economic efficiency evaluation module for evaluating the economic efficiency of electromechanical coupling transmission in step 3, an electromechanical coupling transmission driving cycle adaptability evaluation module for evaluating the driving cycle adaptability of electromechanical coupling transmission in step 4, a component feature parameter rationality evaluation module for evaluating the rationality of component feature parameters in step 5, a structure and cost evaluation module for evaluating the structure and cost in step 6, and a comprehensive evaluation module for performing a comprehensive evaluation in step 7.

12. A platform for implementing the configuration evaluation method for electromechanical coupling transmission of hybrid electric vehicles of claim 5, comprising:

an energy flow transfer path evaluation module for evaluating the energy flow transfer path in step 1, an electromechanical coupling transmission dynamic performance evaluation module for evaluating the dynamic performance of electromechanical coupling transmission in step 2, an electromechanical coupling transmission economic efficiency evaluation module for evaluating the economic efficiency of electromechanical coupling transmission in step 3, an electromechanical coupling transmission driving cycle adaptability evaluation module for evaluating the driving cycle adaptability of electromechanical coupling transmission in step 4, a component feature parameter rationality evaluation module for evaluating the rationality of component feature parameters in step 5, a structure and cost evaluation module for evaluating the structure and cost in step 6, and a comprehensive evaluation module for performing a comprehensive evaluation in step 7.

13. A platform for implementing the configuration evaluation method for electromechanical coupling transmission of hybrid electric vehicles of claim 6, comprising:

an energy flow transfer path evaluation module for evaluating the energy flow transfer path in step 1, an electromechanical coupling transmission dynamic performance evaluation module for evaluating the dynamic performance of electromechanical coupling transmission in step 2, an electromechanical coupling transmission economic efficiency evaluation module for evaluating the economic efficiency of electromechanical coupling transmission in step 3, an electromechanical coupling transmission driving cycle adaptability evaluation module for evaluating the driving cycle adaptability of electromechanical coupling transmission in step 4, a component feature parameter rationality evaluation module for evaluating the rationality of component feature parameters in step 5, a structure and cost evaluation module for evaluating the structure and cost in step 6, and a comprehensive evaluation module for performing a comprehensive evaluation in step 7.

14. A platform for implementing the configuration evaluation method for electromechanical coupling transmission of hybrid electric vehicles of claim 7, comprising:

an energy flow transfer path evaluation module for evaluating the energy flow transfer path in step 1, an electromechanical coupling transmission dynamic performance evaluation module for evaluating the dynamic performance of electromechanical coupling transmission in step 2, an electromechanical coupling transmission economic efficiency evaluation module for evaluating the economic efficiency of electromechanical coupling transmission in step 3, an electromechanical coupling transmission driving cycle adaptability evaluation module for evaluating the driving cycle adaptability of electromechanical coupling transmission in step 4, a component feature parameter rationality evaluation module for evaluating the rationality of component feature parameters in step 5, a structure and cost evaluation module for evaluating the structure and cost in step 6, and a comprehensive evaluation module for performing a comprehensive evaluation in step 7.

* * * * *